US010178051B2

(12) United States Patent
Tu et al.

(10) Patent No.: US 10,178,051 B2
(45) Date of Patent: Jan. 8, 2019

(54) DATA TRANSMISSION METHOD AND APPARATUS FOR TERMINAL

(71) Applicant: Huawei Technologies Co., Ltd., Shenzhen, Guangdong (CN)

(72) Inventors: Yi Tu, Shenzhen (CN); Jia Wan, Shenzhen (CN); Xihua Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 15/612,987

(22) Filed: Jun. 2, 2017

(65) Prior Publication Data

US 2017/0324680 A1 Nov. 9, 2017

Related U.S. Application Data

(63) Continuation of application No. PCT/CN2015/083695, filed on Jul. 9, 2015.

(30) Foreign Application Priority Data

Dec. 5, 2014 (CN) .......................... 2014 1 0736932

(51) Int. Cl.
| | |
|---|---|
| *H04L 12/24* | (2006.01) |
| *H04L 12/935* | (2013.01) |
| *H04W 48/20* | (2009.01) |
| *H04L 29/08* | (2006.01) |
| *H04L 29/06* | (2006.01) |
| *H04L 12/707* | (2013.01) |

(Continued)

(52) U.S. Cl.
CPC .......... *H04L 49/3054* (2013.01); *H04L 45/24* (2013.01); *H04L 49/30* (2013.01); *H04L 69/14* (2013.01); *H04L 69/16* (2013.01); *H04L 69/30* (2013.01); *H04L 69/321* (2013.01); *H04W 48/20* (2013.01); *H04W 76/15* (2018.02); *H04L 45/245* (2013.01)

(58) Field of Classification Search
CPC ....... H04L 45/24; H04L 45/245; H04L 49/30; H04L 69/14; H04L 69/16; H04L 12/24; H04W 48/20; H04W 76/15
See application file for complete search history.

(56) References Cited

U.S. PATENT DOCUMENTS

| | | | | |
|---|---|---|---|---|
| 8,868,733 | B2 * | 10/2014 | Livet .................. | H04W 60/005 709/224 |
| 2009/0103481 | A1 | 4/2009 | Mahajan et al. | |

(Continued)

FOREIGN PATENT DOCUMENTS

| | | |
|---|---|---|
| CN | 10182156 A | 9/2010 |
| CN | 102893642 A | 1/2013 |

(Continued)

*Primary Examiner* — Mohamed A Kamara

(57) ABSTRACT

Embodiments of the present invention disclose a data transmission method and apparatus for a terminal. The terminal exchanges data of an application with a server through a first port by using a first access node; when one port in a second port set is in an enabled state, the terminal accesses one access node in a candidate access node set through the enabled port in the second port set, and exchanges, based on the Multipath TCP, the data of the application with the server by using an access node corresponding to the enabled port.

25 Claims, 8 Drawing Sheets

(51) Int. Cl.
*H04W 76/15* (2018.01)
*H04L 12/709* (2013.01)

(56) References Cited

U.S. PATENT DOCUMENTS

| | | |
|---|---|---|
| 2011/0269456 A1 | 11/2011 | Krishnaswamy et al. |
| 2013/0077501 A1 | 3/2013 | Krishnaswamy et al. |
| 2013/0148663 A1* | 6/2013 | Xiong .................. H04L 45/745 370/392 |
| 2013/0194963 A1* | 8/2013 | Hampel ................. H04L 45/24 370/254 |
| 2014/0092731 A1 | 4/2014 | Gupta |
| 2014/0315597 A1 | 10/2014 | Periyalwar et al. |
| 2016/0212696 A1 | 7/2016 | Tu et al. |

FOREIGN PATENT DOCUMENTS

| | | |
|---|---|---|
| CN | 103532878 A | 1/2014 |
| CN | 104581892 A | 4/2015 |
| WO | 2012051493 A1 | 4/2012 |

* cited by examiner

DATA TRANSMISSION METHOD AND APPARATUS FOR TERMINAL

CROSS-REFERENCE TO RELATED APPLICATIONS

This application is a continuation of International Application No. PCT/CN2015/083695, filed on Jul. 9, 2015, which claims priority to Chinese Patent Application No. 201410736932.2, filed on Dec. 5, 2014. The disclosures of the aforementioned applications are hereby incorporated by reference in their entireties.

TECHNICAL FIELD

The present invention relates to the communications field, and in particular, to a data transmission method and apparatus for a terminal.

BACKGROUND

As a Wi-Fi network continuously gains in popularity, one or even more APs of a wireless network are mostly deployed in a public place, such as an airport, a football field, a shopping mall, or a restaurant. However, in a general technology, a terminal device mostly can access only one AP at a time, and use the AP for data transmission. Therefore, it is difficult for the terminal device to properly utilize network resources. A network signal provided by one AP is unstable. Consequently, data transmission efficiency is easily affected, data transmission between application software and a network is not fluent, and user waiting time is increased.

In one aspect, to maintain data transmission efficiency, a solution currently used for most mobile terminals is to switch a data transmission link to access another AP with a relatively high signal strength. However, if a network is to be switched when data transmission is being performed between a server and an application (APP) of a terminal, a TCP connection established under an original AP needs to be first disconnected, and then a TCP connection under a new AP is established, so that data transmission can be continued. In this case, data needs to be reloaded, which still affects data transmission efficiency and increases user waiting time. Specifically, if the APP is a browser, a web page will be reloaded. If the APP is an online video player such as Youku, data of a previously played video needs to be reloaded and buffered from the beginning. Consequently, data transmission efficiency is still affected, data transmission between application software and a network is still not fluent, and user waiting time is still increased.

In another aspect, a physical network interface card is reused by means of a virtual Wi-Fi technology developed by Microsoft Corporation (Microsoft Corporation), to virtualize one physical network interface card into multiple wireless adapters, so that a terminal can access multiple APs corresponding to multiple wireless networks. However, for virtual connections of multiple wireless local area networks supported by this technology, still only one wireless network can be used within a same time period for data transmission, and this can only implement a direct connection with no need of manual switching or authentication when a data transmission link is switched to another wireless network. In addition, a TCP connection still needs to be re-established during a switching process. Such transmission link switching in essence cannot enable a terminal to properly utilize network resources, data transmission efficiency is still affected, data transmission between application software and a network is still not fluent, and user waiting time is still relatively long.

SUMMARY

In view of this, embodiments of the present invention provide a data transmission method and apparatus for a terminal, so that data transmission efficiency is improved, and the terminal can make better use of network resources.

According to a first aspect, an embodiment of the present invention provides a data transmission method for a terminal, where the terminal includes one or more physical network interface cards, one physical network interface card is corresponding to multiple virtual network interface cards, the multiple virtual network interface cards are in a one-to-one correspondence with multiple ports, the multiple ports include a first port and a second port set, the second port set includes one or more ports, the terminal is located within a service coverage area of a first access node and that of an access node in a candidate access node set, the first access node and the access node in the candidate access node set belong to a same type of wireless network, and the candidate access node set includes at least one access node; and the method includes:

exchanging, by the terminal, data of an application with a server through the first port by using the first access node;

accessing one access node in the candidate access node set through an enabled port in the second port set when one port in the second port set is in an enabled state; or accessing at least one access node in the candidate access node set one-to-one through at least one port of multiple enabled ports in the second port set when multiple ports in the second port set are in an enabled state; and exchanging, based on the Multipath TCP, the data of a application with a server through an enabled port by using an access node corresponding to the enabled port, where the Multipath TCP is used for distributing the data to a data link corresponding to the access node.

In a first possible implementation manner of the first aspect, before the accessing one access node in the candidate access node set through an enabled port in the second port set, the method further includes:

obtaining a signal strength of the access node in the candidate access node set; and correspondingly, the accessing one access node in the candidate access node set through an enabled port in the second port set, or accessing at least one access node in the candidate access node set one-to-one through at least one port of multiple enabled ports in the second port set includes:

obtaining a first subset of the candidate access node set, where a signal strength corresponding to an access node in the first subset is greater than a signal strength threshold;

when the first subset includes at least one access node, accessing one access node in the first subset through only one enabled port in the second port set, or accessing the at least one access node in the first subset one-to-one through at least one port of multiple enabled ports in the second port set.

In a second possible implementation manner of the first aspect, before the accessing one access node in the candidate access node set through an enabled port in the second port set , the method further includes:

obtaining a signal frequency of the access node in the candidate access node set; and correspondingly, the accessing one access node in the candidate access node set through an enabled port in the second port set, or accessing at least one access node in the candidate access node set one-to-one through at least one port of multiple enabled ports in the second port set includes:

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group; and when the second subset includes at least one access node, accessing one access node in the second subset through only one enabled port in the second port set, or accessing the at least one access node in the second subset one-to-one through at least one port of multiple enabled ports in the second port set.

In a third possible implementation manner of the first aspect, before the accessing one access node in the candidate access node set through an enabled port in the second port set, the method further includes:

obtaining a signal strength and a signal frequency of the access node in the candidate access node set; and correspondingly, the accessing one access node in the candidate access node set through an enabled port in the second port set, or accessing at least one access node in the candidate access node set one-to-one through at least one port of multiple enabled ports in the second port set includes:

obtaining a first subset of the candidate access node set, where a signal strength corresponding to an access node in the first subset is greater than a signal strength threshold;

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group;

obtaining an intersection set of the first subset and the second subset according to the first subset and the second subset; and when the intersection set includes at least one access node, accessing one access node in the intersection set through only one enabled port in the second port set, or accessing the at least one access node in the intersection set one-to-one through at least one port of multiple enabled ports in the second port set.

With reference to any one of the first aspect or the first to the third possible implementation manners of the first aspect, in a fourth possible implementation manner, before the accessing one access node in the candidate access node set through an enabled port in the second port set when one port in the second port set is in an enabled state; or accessing at least one access node in the candidate access node set one-to-one through at least one port of multiple enabled ports in the second port set when multiple ports in the second port set are in an enabled state, the method further includes:

adjusting the first port to a disabled state.

With reference to the fourth possible implementation manner of the first aspect, in a fifth possible implementation manner, the adjusting the first port to a disabled state specifically includes:

disabling the first port when a signal strength of the first access node corresponding to the first port is less than the signal strength threshold.

With reference to any one of the first aspect or the first to the fifth possible implementation manners of the first aspect, in a sixth possible implementation manner, the accessing one access node in the candidate access node set through an enabled port in the second port set when one port in the second port set is in an enabled state includes:

enabling one port in the second port set; and accessing one access node in the candidate access node set through the enabled port in the second port set; or the accessing at least one access node in the candidate access node set one-to-one through at least one port of multiple enabled ports in the second port set when multiple ports in the second port set are in an enabled state includes:

enabling multiple ports in the second port set; and accessing at least one access node in the candidate access node set one-to-one through at least one port of multiple enabled ports in the second port set.

According to a second aspect, an embodiment of the present invention provides a data transmission method for a terminal, where the terminal includes one or more physical network interface cards, one physical network interface card is corresponding to multiple virtual network interface cards, the multiple virtual network interface cards are in a one-to-one correspondence with multiple ports, the terminal is located within a service coverage area of an access node in a candidate access node set, the candidate access node set includes two or more access nodes, and the access nodes in the candidate access node set belong to a same type of wireless network; and the method includes:

accessing the at least two access nodes through at least two enabled ports, where each port of the at least two ports is corresponding to one different access node; and exchanging, based on the Multipath TCP, data of a application with a server through the at least two ports by using the at least two access nodes, where the Multipath TCP is used for distributing the data to data links corresponding to the access nodes.

In a first possible implementation manner of the second aspect, before the accessing the at least two access nodes through at least two enabled ports, the method further includes:

obtaining a signal strength of the access node in the candidate access node set; and correspondingly, the accessing the at least two access nodes through at least two enabled ports includes:

obtaining a first subset of the candidate access node set, where a signal strength corresponding to an access node in the first subset is greater than a signal strength threshold;

when the first subset includes at least two access nodes, accessing the at least two access nodes in the first subset one-to-one through the at least two enabled ports.

In a second possible implementation manner of the second aspect, before the accessing the at least two access nodes through at least two enabled ports, the method further includes:

obtaining a signal frequency of the access node in the candidate access node set; and correspondingly, the accessing the at least two access nodes through at least two enabled ports includes:

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group;

when the second subset includes at least two access nodes, accessing the at least two access nodes in the second subset one-to-one through the at least two enabled ports.

In a third possible implementation manner of the second aspect, before the accessing the at least two access nodes through at least two enabled ports, the method further includes:

obtaining a signal strength and a signal frequency of the access node in the candidate access node set; and correspondingly, the accessing the at least two access nodes through at least two enabled ports includes:

obtaining a first subset of the candidate access node set, where a signal strength corresponding to an access node in the first subset is greater than a signal strength threshold;

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group;

obtaining an intersection set of the first subset and the second subset according to the first subset and the second subset; and when the intersection set includes at least two access nodes, accessing at least two access nodes in the second subset one-to-one through the at least two enabled ports.

With reference to any one of the second aspect or the first to the third possible implementation manners of the second aspect, in a fourth possible implementation manner, the accessing the at least two access nodes through at least two enabled ports, where each port of the at least two ports is corresponding to one different access node includes:

enabling at least two ports; and accessing the at least two access nodes through at least two enabled ports, where each port of the at least two ports is corresponding to one different access node.

According to a third aspect, an embodiment of the present invention provides a data transmission apparatus, where the apparatus is located in a terminal, the terminal includes one or more physical network interface cards, one physical network interface card is corresponding to multiple virtual network interface cards, the multiple virtual network interface cards are in a one-to-one correspondence with multiple ports, the multiple ports include a first port and a second port set, the second port set includes one or more ports, the terminal is located within a service coverage area of a first access node and that of an access node in a candidate access node set, the first access node and the access node in the candidate access node set belong to a same type of wireless network, and the candidate access node set includes at least one access node, and the apparatus includes:

a control unit, configured to control the terminal to exchange data of an application with a server through the first port by using the first access node; access one access node in the candidate access node set through an enabled port in the second port set when one port in the second port set is in an enabled state, or access at least one access node in the candidate access node set one-to-one through at least one port of multiple enabled ports in the second port set when multiple ports in the second port set are in an enabled state; and a Multipath TCP transmission unit, configured to exchange, based on the Multipath TCP, the data of a application with a server through an enabled port by using an access node corresponding to the enabled port, where the Multipath TCP is used for distributing the data to a data link corresponding to the access node.

In a first possible implementation manner of the third aspect, before accessing one access node in the candidate access node set through an enabled port in the second port set, the control unit is further configured to obtain a signal strength of the access node in the candidate access node set; and correspondingly, the control unit is specifically configured to obtain a first subset of the candidate access node set, where a signal strength corresponding to an access node in the first subset is greater than a signal strength threshold; and when the first subset includes at least one access node, access one access node in the first subset through only one enabled port in the second port set, or access the at least one access node in the first subset one-to-one through at least one port of multiple enabled ports in the second port set.

In a second possible implementation manner of the third aspect, before accessing one access node in the candidate access node set through an enabled port in the second port set, the control unit is further configured to obtain a signal frequency of the access node in the candidate access node set; and correspondingly, the control unit is specifically configured to obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; and when the second subset includes at least one access node, access one access node in the second subset through only one enabled port in the second port set, or access the at least one access node in the second subset one-to-one through at least one port of multiple enabled ports in the second port set.

In a second possible implementation manner of the third aspect, before accessing one access node in the candidate access node set through an enabled port in the second port set, the control unit is further configured to obtain a signal strength and a signal frequency of the access node in the candidate access node set; and correspondingly, the control unit is specifically configured to obtain a first subset of the candidate access node set, where a signal strength corresponding to an access node in the first subset is greater than a signal strength threshold; obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; obtain an intersection set of the first subset and the second subset according to the first subset and the second subset; and when the intersection set includes at least one access node, access one access node in the intersection set through only one enabled port in the second port set, or access the at least one access node in the intersection set one-to-one through at least one port of multiple enabled ports in the second port set.

With reference to any one of the third aspect or the first to the third possible implementation manners of the third aspect, in a fourth possible implementation manner, the control unit is further configured to adjust the first port to a disabled state.

With reference to the fourth possible implementation manner of the third aspect, in a fifth possible implementation manner, the control unit is further configured to:

disable the first port when a signal strength of the first access node corresponding to the first port is less than the signal strength threshold.

With reference to any one of the third aspect or the first to the fifth possible implementation manners of the third aspect, in a sixth possible implementation manner, with respect to the accessing one access node in the candidate access node set through an enabled port in the second port set when one port in the second port set is in an enabled state, the control unit is specifically configured to enable one port in the second port set; and access one access node in the candidate access node set through the enabled port in the second port set; or with respect to the accessing at least one access node in the candidate access node set one-to-one through at least one port of multiple enabled ports in the second port set when multiple ports in the second port set are in an enabled state, the control unit is specifically configured to enable multiple ports in the second port set; and access at least one access node in the candidate access node set one-to-one through at least one port of multiple enabled ports in the second port set.

According to a fourth aspect, an embodiment of the present invention provides a data transmission apparatus, where the apparatus is located in a terminal, the terminal includes one or more physical network interface cards, one physical network interface card is corresponding to multiple virtual network interface cards, the multiple virtual network interface cards are in a one-to-one correspondence with multiple ports, the terminal is located within a service coverage area of an access node in a candidate access node set, the candidate access node set includes two or more access nodes, and the access nodes in the candidate access node set belong to a same type of wireless network, and the apparatus includes:

a control unit, configured to access the at least two access nodes through at least two enabled ports, where each port of the at least two ports is corresponding to one different access node; and a Multipath TCP transmission unit, configured to exchange, based on the Multipath TCP, the data of a application with a server through the at least two ports by using the at least two access nodes, where the Multipath TCP is used for distributing the data to data links corresponding to the access nodes.

In a first possible implementation manner of the fourth aspect, before accessing the at least two access nodes through at least two enabled ports, the control unit is further configured to obtain a signal strength of the access node in the candidate access node set; and correspondingly, with respect to the accessing the at least two access nodes through at least two enabled ports, the control unit is specifically configured to obtain a first subset of the candidate access node set, where a signal strength corresponding to an access node in the first subset is greater than a signal strength threshold; and when the first subset includes at least two access nodes, access the at least two access nodes in the first subset one-to-one through the at least two enabled ports.

In a second possible implementation manner of the fourth aspect, before accessing the at least two access nodes through at least two enabled ports, the control unit is further configured to obtain a signal frequency of the access node in the candidate access node set; and correspondingly, with respect to the accessing the at least two access nodes through at least two enabled ports, the control unit is specifically configured to obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; and when the second subset includes at least two access nodes, access the at least two access nodes in the second subset one-to-one through the at least two enabled ports.

In a third possible implementation manner of the fourth aspect, before accessing the at least two access nodes through at least two enabled ports, the control unit is further configured to obtain a signal strength and a signal frequency of the access node in the candidate access node set; and correspondingly, with respect to the accessing the at least two access nodes through at least two enabled ports, the control unit is further configured to:

obtain a first subset of the candidate access node set, where a signal strength corresponding to an access node in the first subset is greater than a signal strength threshold;

obtain a grouping result of the signal frequency according to a channel frequency range of a wireless network, where each group is corresponding to one different channel in the grouping result;

obtain a second subset of the candidate access node set according to the grouping result, where a signal frequency of a access node in the second subset belongs to a different group;

obtain an intersection set of the first subset and the second subset according to the first subset and the second subset; and when the intersection set includes at least two access nodes, access at least two access nodes in the second subset one-to-one through the at least two enabled ports.

With reference to any one of the fourth aspect or the first to the third possible implementation manners of the fourth aspect, in a fourth possible implementation manner, with respect to the accessing the at least two access nodes through at least two enabled ports, where each port of the at least two ports is corresponding to one different access node, the control unit is specifically configured to enable at least two ports; and access the at least two access nodes through at least two enabled ports, where each port of the at least two ports is corresponding to one different access node.

In comparison with the prior art, the embodiments of the present invention have the following beneficial effects:

In the embodiments of the present invention, a data transmission method and apparatus for a terminal are provided. Multiple access nodes are accessed one-to-one through multiple ports corresponding to a same physical network interface card, so that an application on the terminal exchanges data with a network-side server by using a transmission link corresponding to an access node accessed by the terminal. The Multipath TCP is executed during data exchange, so that multiple transmission links can be multiplexed under a same TCP connection of the application for simultaneous data transmission, and the TCP connection of the application does not need to be re-established in a process of adding or changing a transmission link. Therefore, data transmission efficiency is improved, a terminal device can fully utilize network resources, user waiting time is shortened, and data transmission between application software on the terminal and a network-side server during switching of a transport network is more fluent.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a data transmission method and apparatus for a terminal. The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
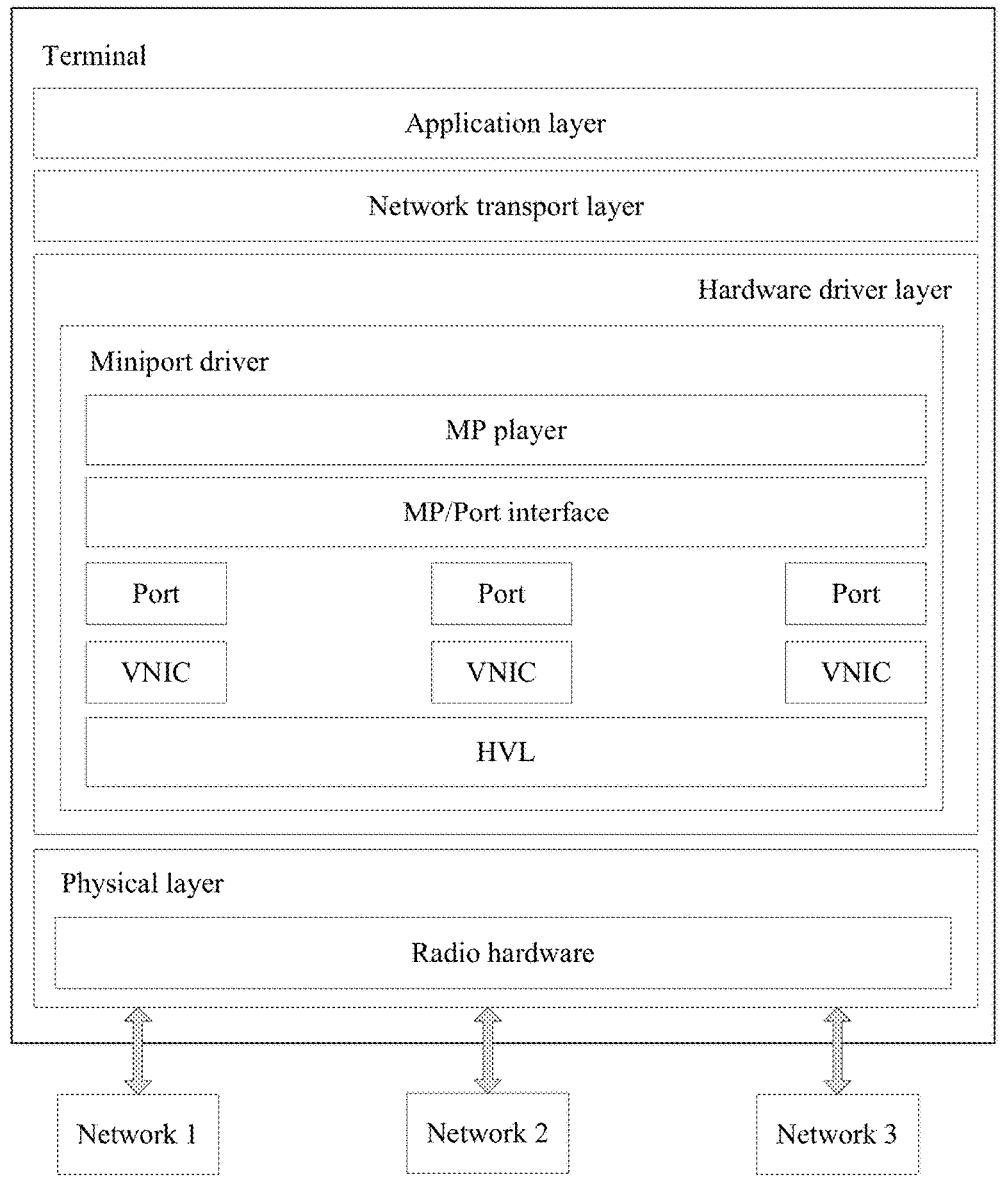
FIG. 1 is a schematic diagram of an overall architecture of a terminal according to an embodiment of the present invention.

FIG. 1 is an overall architectural diagram of a terminal related to an embodiment of the present invention, and schematically includes structures of layers of the terminal, especially components or modules that implement a virtual network interface card technology, according to a hierarchical relationship of a logical architecture. A data transmission method in this embodiment of the present invention is implemented based on the architecture in FIG. 1. It should be noted that, in the virtual network interface card technology, multiple virtual network interface cards may be virtualized based on one piece of radio hardware, and the virtual network interface card technology may be applied to a terminal device, such as a desktop computer, a laptop computer, a cellular phone, or a PDA, and may be extended to any operating system.

Specifically, the terminal includes: a physical layer, a hardware driver layer, a transport layer, and an application layer.

The physical layer includes one or more radio hardware devices, for example, a radio frequency device such as an antenna, to implement communication at the physical layer. A radio hardware device is a hardware basis for a terminal to implement data transmission with a server by using multiple wireless networks. It should be noted that these terminals may have two or more radio hardware devices, but one radio device can still be preferably selected by means of configuration, to participate in communication and data transmission. The physical layer further includes other hardware devices, such as a memory and a processor.

At the hardware driver layer, a miniport driver is installed by using a Microsoft virtual network interface card technology. The driver includes: an MP player, which is configured to control interaction between the driver and an operating system; an MP/port interface, which is configured to process communication between the MP layer and multiple ports; and multiple ports and virtual network interface cards (Virtual Network Interface Cards, VNICs) respectively corresponding to the ports. Each port may be associated with a corresponding wireless network, and therefore controls communication between radio hardware and the corresponding wireless network. Each port maintains a Media Access Control (Media Access Control, MAC) layer status that is required for a connection between a wireless client and the corresponding wireless network. The MAC status is unique relative to other ports. A VNIC provides all hardware-layer services required by a port corresponding to the VNIC. When a port corresponding to a VNIC is enabled, the VNIC is also enabled. A VNIC communicates with a hardware virtualization layer (HVL), and signals between VNICs and physical radio hardware are multiplexed or demultiplexed at this layer, so as to allow the VNICs to transfer the status from the VNICs to the radio hardware and allow the radio hardware to represent a corresponding port to perform wireless communication with a corresponding network. In conclusion, at the hardware driver layer shown in FIG. 1, the miniport driver can virtualize one piece of radio hardware into multiple virtual network interface cards VNICs and multiple ports. Different ports and VNICs can access different access nodes, so that the terminal can keep connected to multiple access nodes at the same time. In addition, an internal structure of the miniport driver is transparent to the application layer. The application layer only knows that the terminal has multiple network interface cards. The application layer can control a connection status of each port and VNIC only by using an interface provided by the miniport driver, and enable each port and VNIC to access a designated AP.

The transport layer is used to run a transmission protocol to maintain a TCP connection established with a network-side server.

The application layer is used to manipulate and coordinate a structure or a module of another layer to complete a task and implement a function, including application software and a client installed on a terminal, such as contacts, clock, or a Youku client.

In particular, in this embodiment of the present invention, the transport layer includes a module supporting the Multipath Transmission Control Protocol (MPTCP). The MPTCP protocol is an extension of the conventional TCP protocol, that is, a protocol that implements simultaneous data transmission using multiple paths at the transport layer. For communication using the conventional TCP protocol, a connection can be established only between a pair of addresses. When either address in the connection is unreachable, the connection needs to be disconnected, and the only way to restore data transmission is to re-establish a connection. The MPTCP can support multipath transmission, so that multiple paths are available between two addresses in a TCP connection. Therefore, a risk that an address is unreachable is lowered, and the TCP connection is not disconnected in a process of adding or changing a transmission path. A congestion mechanism of the MPTCP protocol determines an increased data throughput. An actual throughput of a multipath transmission cannot be less than a maximum throughput of single optimal path transmission. At the MPTCP layer, conventional TCP data can be distributed and separately transmitted on different TCP substreams. Multiple paths indicate that there are multiple TCP substreams. In this embodiment of the present invention, one piece of physical radio hardware physical radio hardware hardwareis virtualized into multiple virtual network interface cards, so that the multiple TCP substreams can be transmitted by using one physical network interface card. Once it is detected that multiple available virtual network interface cards are already connected to a network, the MPTCP protocol divides data of the TCP connection into multiple substreams and corresponds the multiple substreams to the multiple available network interface cards, thereby implement aggregation of multiple transmission links under a single TCP connection. In addition, after all existing ports and VNICs of the terminal are disconnected, provided that a new port and a new VNIC are enabled and connected to the network in a timely manner, the original TCP connection is not disconnected, and TCP data streams flow to a new network by using the new port and the new VNIC. This enables a same TCP connection to be seamlessly switched between different networks. It should be noted that a function of the module may be implemented by using and configuring a chip that supports the MPTCP protocol. The MPTCP protocol is a protocol fully compatible with the TCP protocol. All management information of the MPTCP is transmitted by using a TCP option field. Therefore, provided that both devices that exchange data with each other support the MPTCP protocol, one MP_CAP (Multipath Capable) option is carried in an initial connection.

Figure 2A:
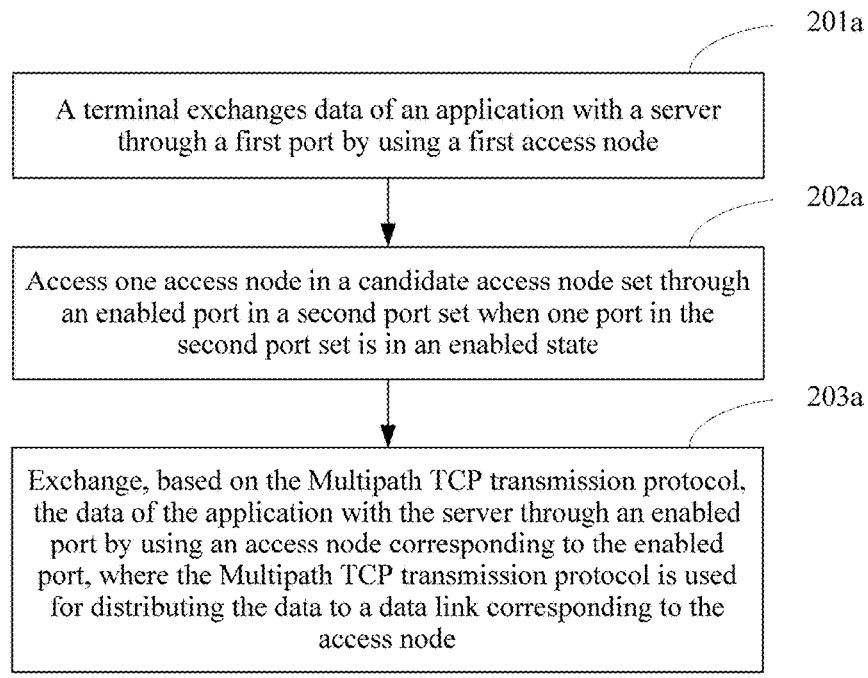
FIG. 2a and FIG. 2b are two schematic flowcharts of data transmission methods according to an embodiment of the present invention.
Figure 2B:
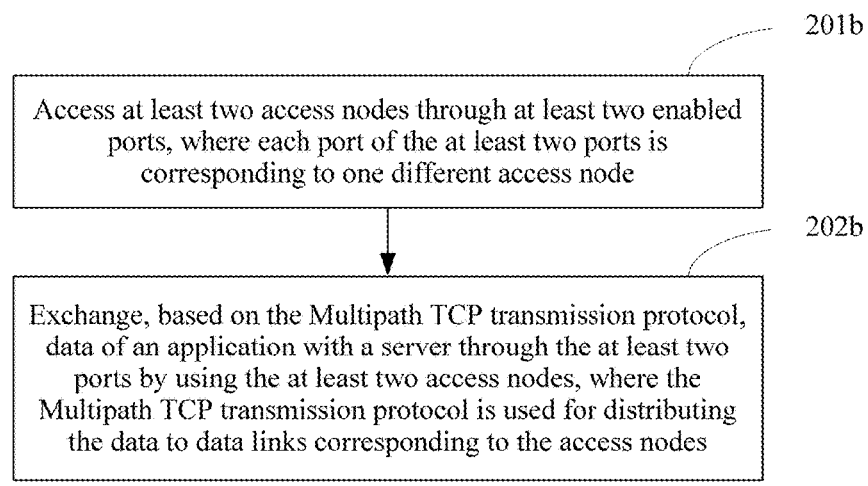
Figure 2C:
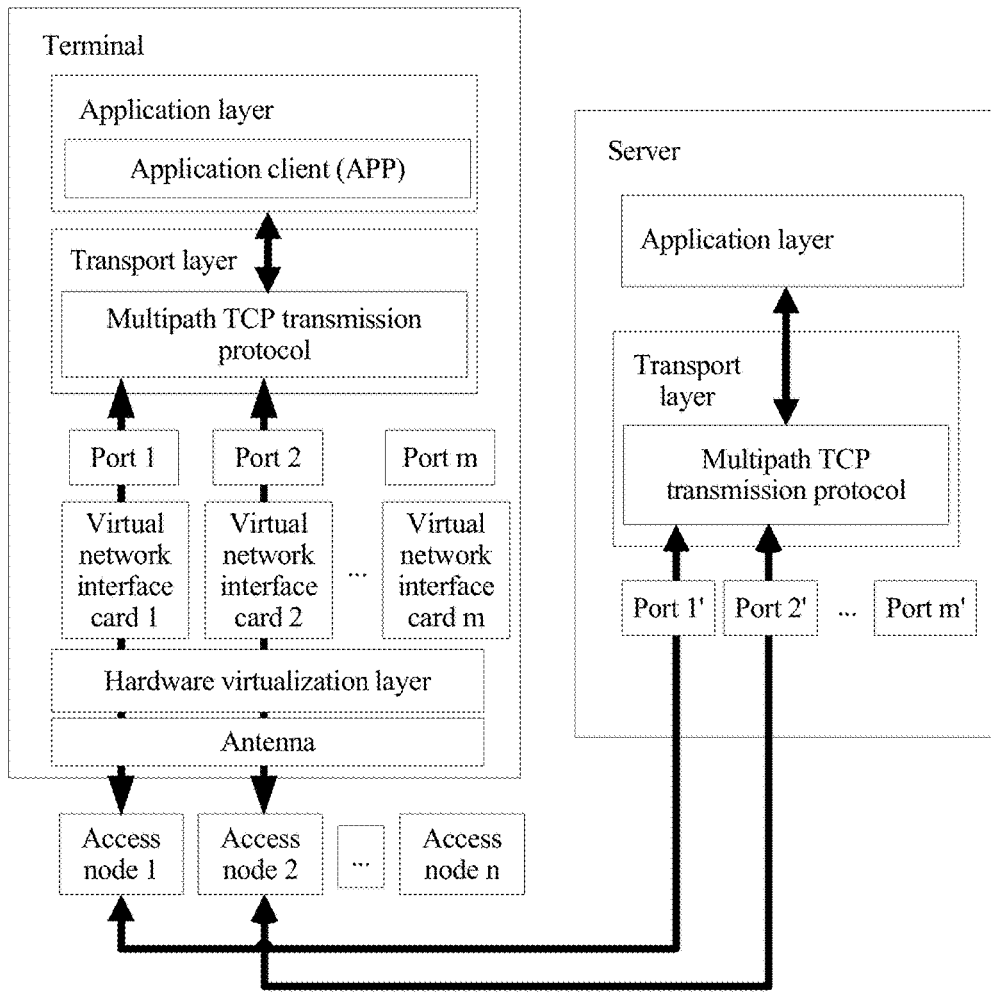
FIG. 2c is a schematic descriptive diagram of a data transmission method according to an embodiment of the present invention.

FIG. 2a and FIG. 2b are schematic flowcharts of data transmission methods described in an embodiment of the present invention. The data transmission methods are both applied to a terminal. The method shown in FIG. 2a is applied to a terminal. The terminal includes one or more physical network interface cards, one physical network interface card is corresponding to multiple virtual network interface cards, the multiple virtual network interface cards are in a one-to-one correspondence with multiple ports, the multiple ports include a first port and a second port set, the second port set includes one or more ports, the terminal is located within a service coverage area of a first access node and that of an access node in a candidate access node set, the first access node and the access node in the candidate access node set belong to a same type of wireless network, and the candidate access node set includes at least one access node. Radio of the terminal may be a network interface card or the like, and is not limited in this embodiment of the present invention.

It should be noted that, before the method in this embodiment of the present invention is executed, a miniport driver and an operating system that supports an MPTCP protocol should be installed on the terminal.

It should be noted that the access node in this embodiment of the present invention specially refers to an access node of a wireless network, and specifically, may be an access point (Access Point, AP) or a router of a wireless Wi-Fi network, an access point of a WiMAX network, or a base station of a wireless cellular network, or the like. A type of a wireless network and a specific form of an access node of the wireless network are not limited in the present invention. In addition, access nodes that belong to a same type of wireless network, such as access nodes that all belong to a wireless Wi-Fi network, or access nodes that all belong to a WiMAX network, or access nodes that all belong to a wireless cellular network, such as a 2G network, a 3G network, or a 4G network. That is, in the embodiments shown in FIG. 2a and FIG. 2b, only an access node accessed by one physical network interface card of the terminal is described, and communication and connection are implemented between the described virtual network interface card and the same physical network interface card of the terminal. Therefore, the mentioned access nodes and the first access node are all belong to a wireless Wi-Fi network, a WiMAX network, or a wireless cellular mobile network, such as a 2G network, a 3G network, or a 4G network.

In addition, it should be understood that, in this embodiment of the present invention, a location of the terminal is covered by services of at least two access nodes. This may be interpreted as that at the location of the terminal, at least two access nodes can provide a transmission link for exchanging data between the terminal and a server. Each different access node is corresponding to one different transmission link.

The method shown in FIG. 2a includes the following steps.

S201a: The terminal exchanges data of an application with the server through the first port by using the first access node.

Optionally, before S201a, the following step may be performed:

obtaining a signal strength of the access node in the candidate access node set.

In this case, specifically, step S201a includes:

obtaining a first subset of the candidate access node set, where a signal strength corresponding to an access node in the first subset is greater than a signal strength threshold; and when the first subset includes at least one access node, accessing one access node in the first subset through only one enabled port in the second port set, or accessing the at least one access node in the first subset one-to-one through at least one port of multiple enabled ports in the second port set.

Specifically, in this embodiment of the present invention, the signal strength threshold indicates a capability of the terminal of using network resources provided by the access node. Further, this may be interpreted as that, for the terminal, if a signal strength of an access node is greater than the signal strength threshold, a transmission link on which the access node is located is suitable for transmitting data. A person skilled in the art should understand that generally a unit of a signal strength threshold that describes a signal strength is the same as that of a signal strength, and is dBm.

In another case, before S201a, the following step may further be performed:

obtaining a signal frequency of the access node in the candidate access node set.

In this case, specifically, step S201a includes:

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group; and when the second subset includes at least one access node, accessing one access node in the second subset through only one enabled port in the second port set, or accessing the at least one access node in the second subset one-to-one through at least one port of multiple enabled ports in the second port set.

In still another case, before S201a, the following step may further be performed:

obtaining a signal strength and a signal frequency of the access node in the candidate access node set.

In this case, specifically, step S201a includes:

obtaining a signal strength and a signal frequency of at least one access node, except the first access node, that covers the terminal.

Accessing at least one access node except the first access node through at least one port except the first port includes:

obtaining a first subset of the candidate access node set, where a signal strength corresponding to an access node in the first subset is greater than a signal strength threshold;

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group;

obtaining an intersection set of the first subset and the second subset according to the first subset and the second subset; and when the intersection set includes at least one access node, accessing one access node in the intersection set through only one enabled port in the second port set, or accessing the at least one access node in the intersection set one-to-one through at least one port of multiple enabled ports in the second port set.

Specifically, in this embodiment of the present invention, the wireless network is a wireless Wi-Fi network or a wireless cellular mobile network. A person skilled in the art should understand that according to a standard of the wireless Wi-Fi network, such as prevailing 802.11a, 802.11b, 802.11g, or 802.11n, a frequency band used by a Wi-Fi network may be divided into multiple channels, and a corresponding frequency range is specified for each channel. In addition, a frequency band of the wireless cellular network, is also divided into multiple channels according to a related standard, and a corresponding frequency range is specified for each channel. The standards on which channel division of the two types of networks is based are not limited in the present invention.

S202a: When one port in the second port set is in an enabled state, access one access node in the candidate access node set through the enabled port in the second port set.

In this case, optionally, S202a is performed as follows: Enable one port in the second port set, and access one access node in the candidate access node set through the enabled port in the second port set.

Alternatively, S202a is: When multiple ports in the second port set are in an enabled state, access at least one access node in the candidate access node set one-to-one through at least one port of multiple enabled ports in the second port set.

In this case, optionally, S202a is performed as follows: Enable multiple ports in the second port set, and access at least one access node in the candidate access node set one-to-one through at least one port of multiple enabled ports in the second port set.

Optionally, after S202a is performed, a state of the first port is adjusted to a disabled state.

Preferably, after S202a is performed, the first port is disabled if a signal strength of the first access node corresponding to the first port is less than the signal strength threshold.

By disabling the first port, switching of a data transmission link between the terminal and the server for an application is implemented.

S203a: Exchange, based on the Multipath TCP, the data of the data of a application with a server through an enabled port by using an access node corresponding to the enabled port, where the Multipath TCP is used for distributing the data to a data link corresponding to the access node.

Specifically, S203a includes:

segmenting the data according to the Multipath TCP, and establishing, between the terminal and the server, one TCP connection that includes multiple substreams, where each substream is in a one-to-one correspondence with the access node corresponding to the enabled port; and exchanging, by using the multiple substreams, the segmented data with the server through the enabled port and the access node corresponding to the enabled port, where each segment of the segmented data is corresponding to one of the substreams.

In conclusion, the embodiment shown in FIG. 2a describes a data transmission method. Multiple access nodes are accessed through multiple ports. When a terminal has exchanged data with a server by using an access node corresponding to one port, at least one port is changed to an enabled state to implement the Multipath TCP, so that an application on the terminal exchanges data with a network-side server by using a wireless network corresponding to the enabled port, implementing aggregation of multiple data transmission links. In another case, a port enabled before updating of a port state may further be disabled to implement switching of a data transmission link. In an aggregation and/or switching process, the Multipath TCP is executed during data exchange, so that multiple transmission links can be multiplexed under a same TCP connection of the application for simultaneous data transmission. In addition, in a process of adding or changing a transmission link, a TCP connection does not need to be re-established. Therefore, data transmission efficiency is improved, a terminal device can fully utilize network resources, user waiting time is shortened, and data transmission between application software on the terminal and a network-side server during switching of a transport network is more fluent.

A data transmission method shown in FIG. 2b is applied to a terminal. The terminal includes one or more physical network interface cards, one physical network interface card is corresponding to multiple virtual network interface cards, the multiple virtual network interface cards are in a one-to-one correspondence with multiple ports, the terminal is located within a service coverage area of an access node in a candidate access node set, the candidate access node set includes two or more access nodes, and the access nodes in the candidate access node set belong to a same type of wireless network. Radio of the terminal may be a physical network interface card or the like, and is not limited in this embodiment of the present invention.

The method shown in FIG. 2b includes the following steps.

S201b: Access the at least two access nodes through at least two enabled ports, where each port of the at least two ports is corresponding to one different access node.

Optionally, before S201b, the following step may further be performed:

obtaining a signal strength of the access node in the candidate access node set.

In this case, specifically, step S201b includes:

obtaining a first subset of the candidate access node set, where a signal strength corresponding to an access node in the first subset is greater than a signal strength threshold; and when the first subset includes at least two access nodes, accessing the at least two access nodes in the first subset one-to-one through the at least two enabled ports.

Specifically, in this embodiment of the present invention, the signal strength threshold indicates a capability of the terminal of using network resources provided by the access node. Further, this may be interpreted as that, for the terminal, a transmission link on which an access node whose signal strength is greater than the signal strength threshold is located is suitable for data transmission. A person skilled in the art should understand that generally a unit of a signal strength threshold that describes a signal strength is the same as that of a signal strength, and is dBm.

In another case, before S201b, the following step may further be performed:

obtaining a signal frequency of the access node in the candidate access node set.

In this case, specifically, step S201b includes:

obtaining a grouping result of the signal frequency according to a channel frequency range of a wireless network, where each group is corresponding to one different channel in the grouping result; obtaining a second subset of the candidate access node set according to the grouping result, where a signal frequency of a access node in the second subset belongs to a different group; and when the second subset includes at least two access nodes, accessing the at least two access nodes in the second subset through the at least two enabled ports.

In still another case, before S201b, the following step may further be performed:

obtaining a signal strength and a signal frequency of the access node in the candidate access node set.

In this case, specifically, step S201b includes:

obtaining a first subset of the candidate access node set, where a signal strength corresponding to an access node in the first subset is greater than a signal strength threshold;

obtaining a grouping result of the signal frequency according to a channel frequency range of a wireless network, where each group is corresponding to one different channel in the grouping result;

obtaining a second subset of the candidate access node set according to the grouping result, where a signal frequency of a access node in the second subset belongs to a different group;

obtaining an intersection set of the first subset and the second subset according to the first subset and the second subset; and when the intersection set includes at least two access nodes, accessing at least two access nodes in the second subset one-to-one through the at least two enabled ports.

S202b: Exchange, based on the Multipath TCP, data of a application with a server through the at least two ports by using the at least two access nodes, where the Multipath TCP is used for distributing the data to data links corresponding to the access nodes.

Specifically, S202b includes:

segmenting the data according to the Multipath TCP, and establishing, between the terminal and the server, one TCP connection that includes multiple substreams, where each substream is in a one-to-one correspondence with an access node corresponding to the enabled port; and exchanging, by using the multiple substreams, the segmented data with the server through the enabled port and the access node corresponding to the enabled port, where each segment of the segmented data is corresponding to one of the substreams.

Optionally, after S202b, a step of adding a transmission link, that is, S203b, may further be included:

access at least one other access node in the candidate access node set through at least one other enabled port; and exchanging, based on the Multipath TCP, the data of a application with a server through an enabled port by using an access node corresponding to the enabled port, where the Multipath TCP is used for distributing the data to a data link corresponding to the access node.

A person skilled in the art should understand that, for specific implementation methods of changing a port state of the terminal, selecting an access node, and exchanging data with the server in S203b, refer to the embodiment shown in FIG. 2a, and steps S201b and S202b. Details are not described in S203b again. Certainly, after S203b, a transmission link may be added or changed again. Likewise, for an implementation method, refer to the embodiment shown in FIG. 2a, and steps S201b and S202b. Details are not described herein again.

Because the Multipath TCP is executed during data exchange, a TCP connection of the application does not need to be re-established in a process of adding or changing a transmission link in S203b or after S203b.

In conclusion, the embodiment shown in FIG. 2b describes a data transmission method. A terminal accesses at least two access nodes one-to-one through at least two enabled ports, to exchange data of an application with a server. The Multipath TCP is executed during data exchange, so that multiple transmission links can be multiplexed under a same TCP connection of the application for simultaneous data transmission. Therefore, data transmission efficiency is improved, a terminal device can fully utilize network resources, user waiting time is shortened, and data transmission between application software on a terminal and a network-side server during switching of a transport network is more fluent.

In the data transmission methods described in the present invention, automatic scheduling of data transmission links, which may be specifically aggregation, switching, or maintaining of the data links, can be completed according to a specific network environment in which a terminal is located. In addition, a TCP connection for data transmission is not disconnected in a process of changing a data transmission link. Therefore, data transmission efficiency is improved.

Figure 3:
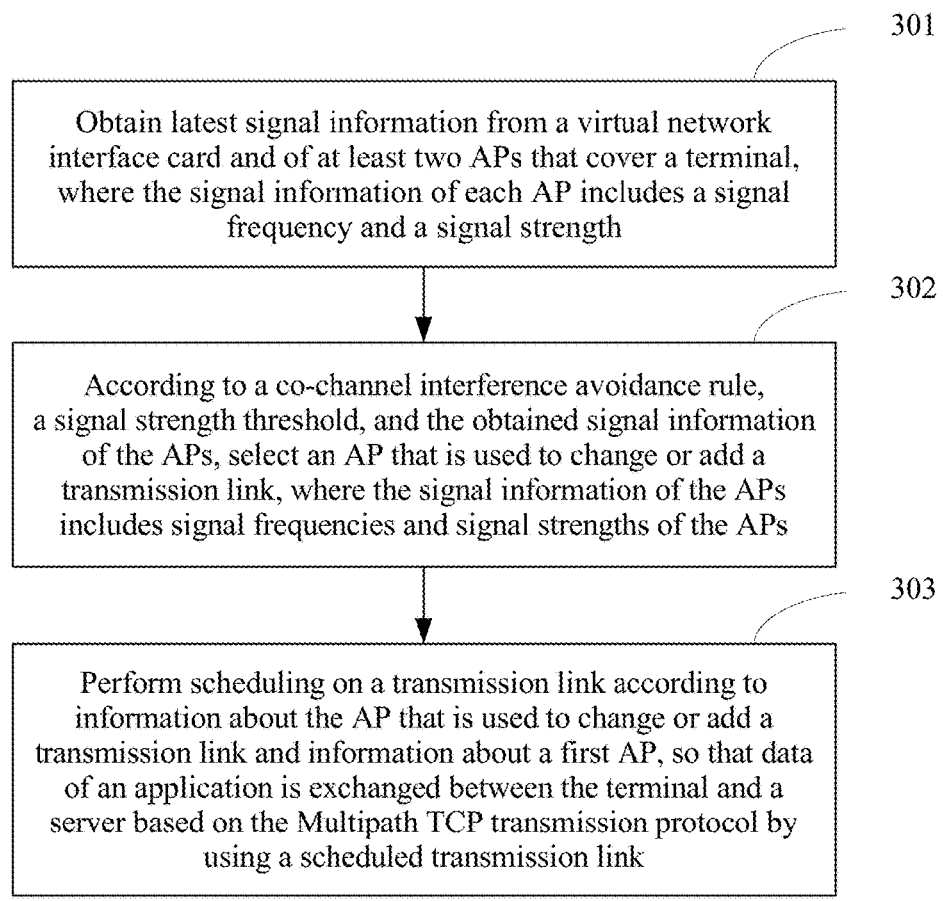
FIG. 3 is a schematic flowchart of a data transmission method according to an embodiment of the present invention.

FIG. 3 shows a flowchart of a data transmission method in a specific scenario. As a solution, in an embodiment shown in FIG. 3, signal information of an access node includes a signal frequency HZ and a signal strength Signal. For ease of description, an example in which a terminal exchanges data of an application with a server by using a same physical network interface card is used for description. A virtual network interface card corresponding to a same physical network interface card can access only one type of wireless network, such as a wireless Wi-Fi network or a wireless cellular network. A location of the terminal is covered by services of at least two access nodes that belong to a same wireless Wi-Fi network, or a location of the terminal is covered by services of at least two access nodes that belong to a same wireless cellular network. Alternatively, the terminal may have not yet performed data transmission with a server by using any access node. The AP herein is a generalized concept, includes an access point in a wireless Wi-Fi network, and also includes a base station in a wireless cellular mobile network, and the like.

It should be noted that a type of the wireless network is not limited in this embodiment of the present invention. In the embodiment shown in FIG. 3, current mainstream technologies, that is, a wireless Wi-Fi network and/or a wireless cellular mobile network, are used as an example.

Specifically, before S301 is performed, the terminal may have already performed data transmission for an application with the server by using one access node, which is referred to as a first AP. Apparently, the terminal is located within a service coverage area of the first AP. The terminal obtains signal information of the first AP by using a physical network interface card. The signal information includes a signal frequency HZ and a signal strength Signal. When the first AP is an access node of a wireless Wi-Fi network, other access nodes, of the wireless Wi-Fi network, whose services cover the terminal constitute a candidate access node set. When the first AP is an access node of a wireless cellular mobile network, other access nodes, of the wireless cellular mobile network, whose services cover the terminal constitute a candidate access node set.

A specific method includes the following steps.

S301: Obtain latest signal information from the virtual network interface card and of at least two APs that cover the terminal, where signal information of each AP includes a signal frequency HZ and a signal strength Signal.

Specifically, the terminal may proactively obtain the information from the virtual network interface card, or the information may be reported by the virtual network interface card.

Optionally, before S301 is performed, the terminal may have already performed data transmission for an application with the server by using one access node, such as a first AP. In this case, the signal information of the at least two APs includes signal information of the first AP.

Optionally, before S301 is performed, the terminal may have already performed data transmission for an application with the server by using one access node, such as a first AP. In this case, S301 may also be as follows:

obtain latest signal information from the virtual network interface card and of an AP in a candidate access node set that covers the terminal, where signal information of each AP includes a signal frequency HZ and a signal strength Signal.

It should be noted that, if the terminal has already performed, before S301 is performed, data transmission for an application with the server by using one access node, such as a first AP, all the at least two APs corresponding to the AP signal information obtained in S301 are APs in the candidate access node set.

Specifically, in the embodiment shown in FIG. 3, the signal information of the APs that cover the terminal is detected by the same physical network interface card of the terminal. That is, signals of the APs are all of a wireless Wi-Fi network or are all of a wireless cellular mobile network. The physical network interface card is capable of perceiving a signal change of the APs that cover the terminal. It should be noted that in this embodiment of the present invention, to save resources, the physical network interface card can be set to detect AP signal information at intervals, or the terminal may obtain, at intervals from the virtual network interface card, AP signal information detected by the physical network interface card. This is not limited in the present invention.

The terminal may maintain AP information from the virtual network interface card. The AP information is found by the physical network interface card. The information may further include signal bandwidth and/or QoS of the APs. Maintenance includes obtaining, updating, storing, deleting, transmitting, or sending the AP information from the virtual network interface card.

S302: According to a co-channel interference avoidance rule, a signal strength threshold, and the obtained signal information of the APs, select an AP that is used to change or add a transmission link, where the signal information of the APs includes signal frequencies and signal strengths of the APs.

Co-channel interference refers to a situation in which mutual interference is caused at a receive end because frequency bands of two or more wireless signals overlap, and consequently signal quality and data transmission quality cannot be ensured.

It should be noted that the signal strength threshold indicates a capability of the terminal of using network resources provided by the access node. Further, this maybe interpreted as that, for the terminal, a transmission link on which an access node whose signal strength is greater than the signal strength threshold is located is suitable for data transmission. A person skilled in the art should understand that generally a unit of a signal strength threshold that describes a signal strength is the same as that of a signal strength, and is dBm.

Figure 4:
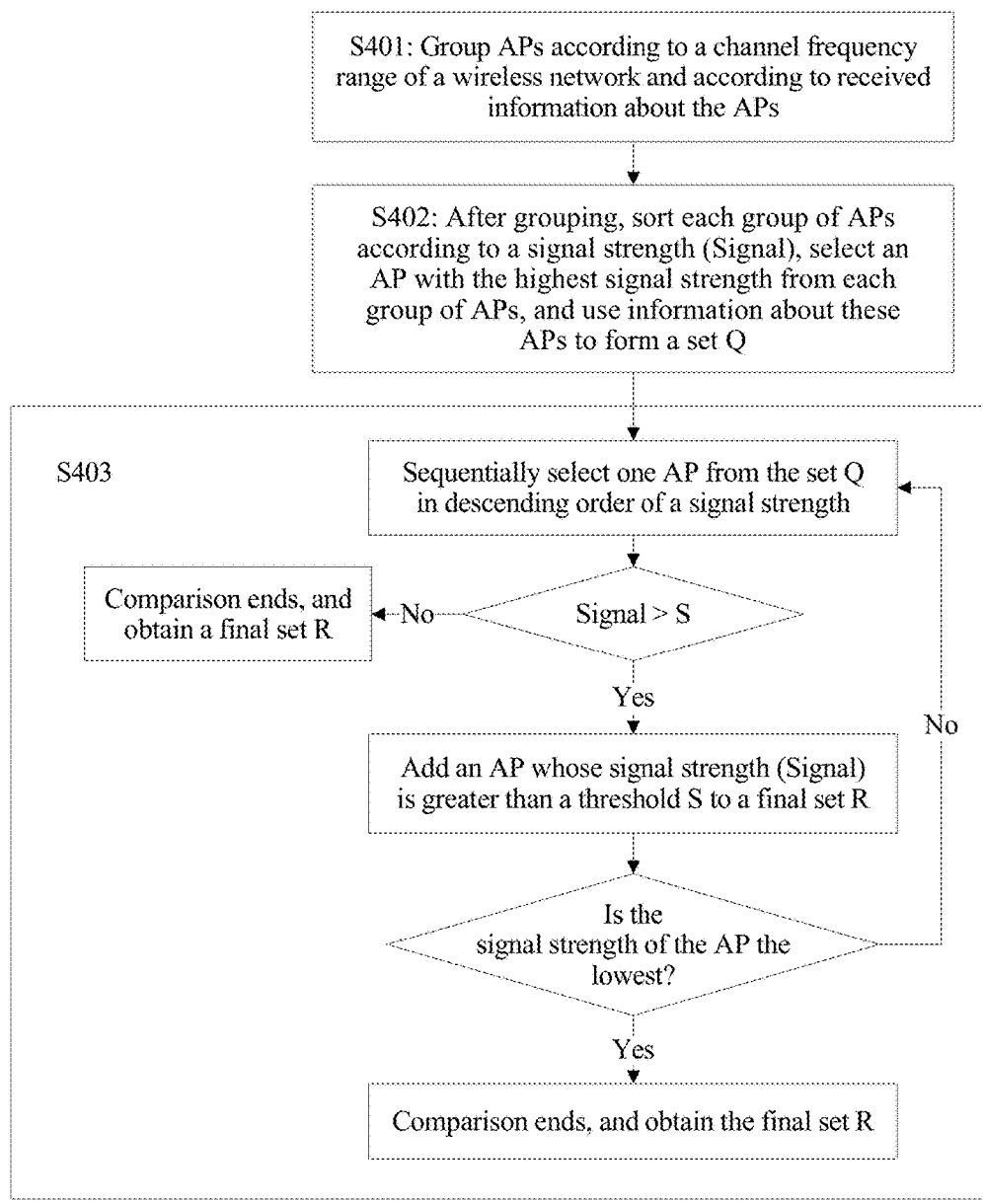
FIG. 4 is a schematic flowchart of a specific execution method of step 302 according to an embodiment of the present invention.

Specifically, a block diagram of a procedure of an implementation manner of S302 is shown in FIG. 4. FIG. 4 includes the following steps.

S401: Group APs according to a channel frequency range of a wireless network and according to obtained information about the APs in a candidate access node set.

Specifically, when the wireless network is a wireless Wi-Fi network, a person skilled in the art should understand that a currently prevailing standard is 802.11a, 802.11b, 802.11g, 802.11n, or the like. For example, an AP of a wireless Wi-Fi network in China is generally configured according to the 802.11a or 802.11g standard, and supports an application in a frequency band with a center frequency of approximately 2.4 GHz. A frequency band of the wireless Wi-Fi network is divided into 11 or 13 channels (also referred to as frequency channels). An signal frequency HZ Analyzer may group the APs into 11 groups or 13 groups according to frequency ranges of the 11 or 13 channels of the wireless Wi-Fi network. Preferably, because only channels 1, 6, and 11 among the 11 channels are independent, and only channels 1, 6, and 13 among the 13 channels are independent, an AP of the wireless Wi-Fi network generally uses the three channels, that is, the channels 1, 6, and 11 (or 13) during network deployment. "Independent" is understood as that no frequency bands overlap between the channels. The signal frequency HZ Analyzer may group the APs into three groups according to frequency ranges of the three channels of the wireless Wi-Fi network. Therefore, a solution is simplified, and processing resources are saved. Similarly, when the wireless network is a wireless cellular mobile network, a person skilled in the art should understand that because each cell is generally served by at least one base station during network deployment, base stations of neighboring cells also need to avoid co-channel interference generated by sent signals. Therefore, a related standard also specifies a channel division method. The signal frequency HZ Analyzer may group the APs according to the channel division method of the wireless cellular mobile network.

S402: After grouping, sort each group of APs according to a signal strength (signal), select an AP with the highest signal strength from each group of APs, and use information about these APs to form a set Q.

S403: Compare a signal strength Signal of an AP in the set Q with a signal strength threshold (S) to obtain a final set R, where a signal strength of an AP in R is greater than the signal strength threshold.

Specifically, S403 may be performed in the following execution manner:

sequentially selecting one AP from the set Q in descending order of a signal strength, and comparing a signal strength Signal of the AP with the signal strength threshold (S).

For the selected AP, if the signal strength is less than the signal strength threshold (Signal <S), the comparison ends, and the final set R is fed back to a processor; or if the signal strength is greater than or equal to the signal strength threshold (Signal ≥S), information about the AP is added to the final set R.

If the AP is already an AP with the lowest signal strength, the comparison ends, and the final set R is fed back to a processor; or if the AP is not an AP with the lowest signal strength, a next AP is selected for comparison until the comparison ends, and the final set R is obtained.

It should be noted that a specific command for implementing the foregoing AP algorithm is not limited in this embodiment of the present invention. Optionally, dBm is used as a unit of the signal strength. In a Linux operating system, a signal strength of an AP may be obtained by using a command "iwlist wlan0 scanning".

S303: Perform scheduling of transmission links, that is, control switching of the transmission links, or aggregation of the transmission links, or maintain the transmission links according to information about the AP that is used to change or add a transmission link and information about a first AP, so that data of an application is exchanged between the terminal and the server based on the Multipath TCP by using a scheduled transmission link.

It should be noted that in this embodiment of the present invention, switching is understood as changing the transmission link used for exchanging the data of the application between the terminal and the server, from connecting to a transmission link corresponding to the first AP to connecting to at least one transmission link except the transmission link of the first AP; aggregation is understood as changing the transmission link used for exchanging the data of the application between the terminal and the server, from connecting to a transmission link corresponding to the first AP to connecting to the transmission link corresponding to the first AP and at least one transmission link except the transmission link of the first AP; and maintaining the transmission link is understood as neither adding a new transmission link nor disabling a transmission link corresponding to the first AP.

Specifically, in S303, information about an AP selected by a frequency analysis unit and used to change a transmission link may be the final set R, and a control unit performs network scheduling of the transmission link according to the final set R and the information about the first AP. A method for network scheduling is as follows:

When the final result set R is empty, it may be considered that signal strengths of all surrounding APs detected by the terminal are relatively low, and do not meet a signal strength requirement for data transmission between the terminal and the server. Neither data link aggregation nor data link switching is performed.

When the final result set R is not empty, it may be considered that signal strengths of some surrounding APs detected by the terminal are high, and meet a signal strength requirement for data link transmission between the terminal and the server. Further, a signal strength (Signal) of the first AP is compared with the signal strength threshold S.

When the signal strength of the first AP is less than the signal strength threshold (Signal <S), data link switching is performed to change a data link by controlling a port and a virtual network interface card. The data link switching specifically includes: disconnecting a signal connection with the first AP and accessing an AP in the final set R.

When the signal strength of the first AP is greater than the signal strength threshold (Signal >S), data link aggregation is performed to access an AP in the final set R by controlling a status of a port and a virtual network interface card corresponding to the port, without disconnecting a signal connection with the first AP.

It should be noted that, specifically, when transmission link switching is performed, in one aspect, a disabling instruction is sent to a virtual network interface card corresponding to the first AP to instruct to disable the port corresponding to the first AP. Specifically, the disabling instruction may be "if config down". A specific form of the disabling instruction is not limited in this embodiment of the present invention. In another aspect, an enabling instruction is sent to the virtual network interface card to instruct to enable the port. The port is used by the terminal to access an AP that is selected to change a transmission link. One port is corresponding to one different AP. The enabling instruction includes information about the AP that is used to change a transmission link. In addition, the port can access the AP when the port is disabled, but only when the port is enabled, the terminal can perform data transmission by using the AP accessed by the enabled port. It should be noted that an instruction sending sequence in a transmission link switching process is not limited in this embodiment of the present invention; and in this embodiment of the present invention, a relationship between a port and an AP is not bound and may be changed, and a relationship between a specific port and a specific AP may be determined after the port is enabled.

In S303, in the transmission link switching or aggregation process, because the Multipath TCP is executed, multiple transmission links under a same TCP connection of the application can be multiplexed for simultaneous data transmission, and the TCP connection of the application does not need to be re-established in a process of adding or changing a transmission link.

Figure 5:
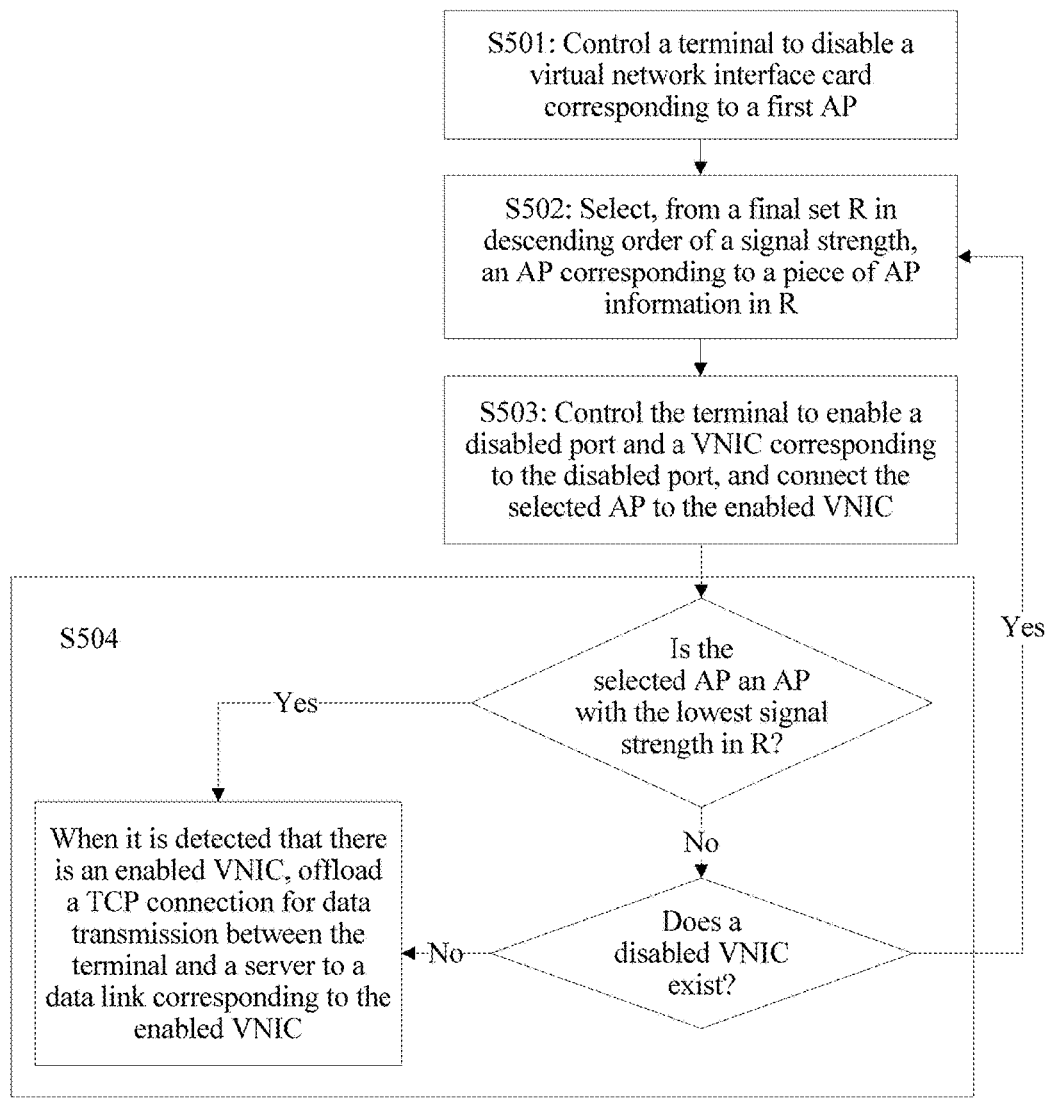
FIG. 5 is a schematic flowchart of a specific execution method of a switching operation in step 303 according to an embodiment of the present invention.

Preferably, transmission link switching may be implemented by using a procedure shown in FIG. 5.

S501: Control a terminal to disable a virtual network interface card corresponding to a first AP.

Specifically, an instruction may be "if config down".

S502: Select, from a final set R in descending order of a signal strength, an AP corresponding to a piece of AP information in R.

S503: Control the terminal to enable a disabled port and a VNIC corresponding to the disabled port, and connect the selected AP to the enabled VNIC.

Specifically, an instruction may be "if config up".

S504: When R includes an AP whose signal strength is less than that of the AP selected in S502 and the terminal still has a disabled VNIC, perform S502 to S504 again to select another AP; alternatively, when the selected AP is an AP with the lowest signal strength in R, or all VNICs of the terminal are enabled, terminate the process of selecting an AP from R; and when it is detected that there is an enabled VNIC, offload a TCP connection for data transmission between the terminal and the server to a data link corresponding to the enabled VNIC.

Specifically, when transmission link aggregation is performed, an enabling instruction is sent to a virtual network interface card to instruct to enable at least one disabled port. The port is configured to access an AP that is selected to add a transmission link. One port is corresponding to one different AP. The enabling instruction includes information about the AP that is used to add a transmission link. In this embodiment of the present invention, a relationship between a port and an AP is not bound and may be changed.

Preferably, transmission link aggregation may be implemented by using a part of the procedure shown in FIG. 5, and specifically, by using a procedure shown in steps S502 to S504. Details are not described herein.

Figure 6:
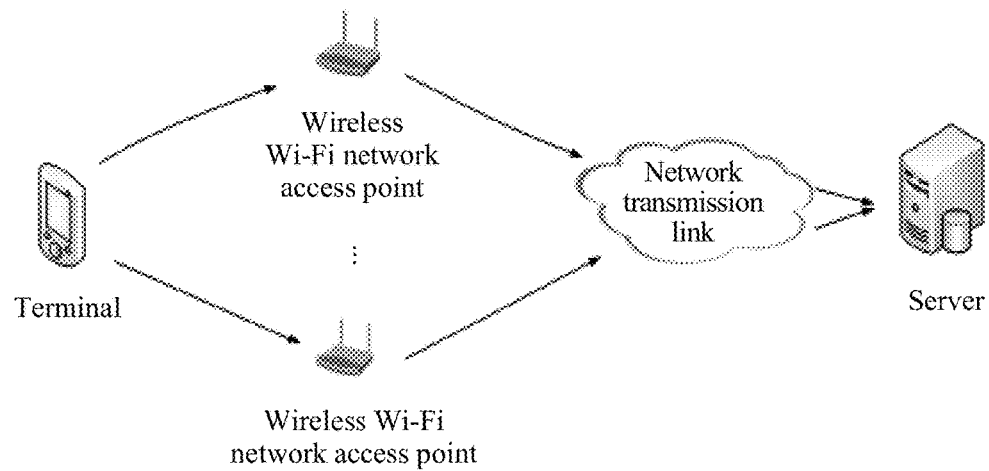
FIG. 6 is an application scenario diagram of a data transmission method according to an embodiment of the present invention.
Figure 7:
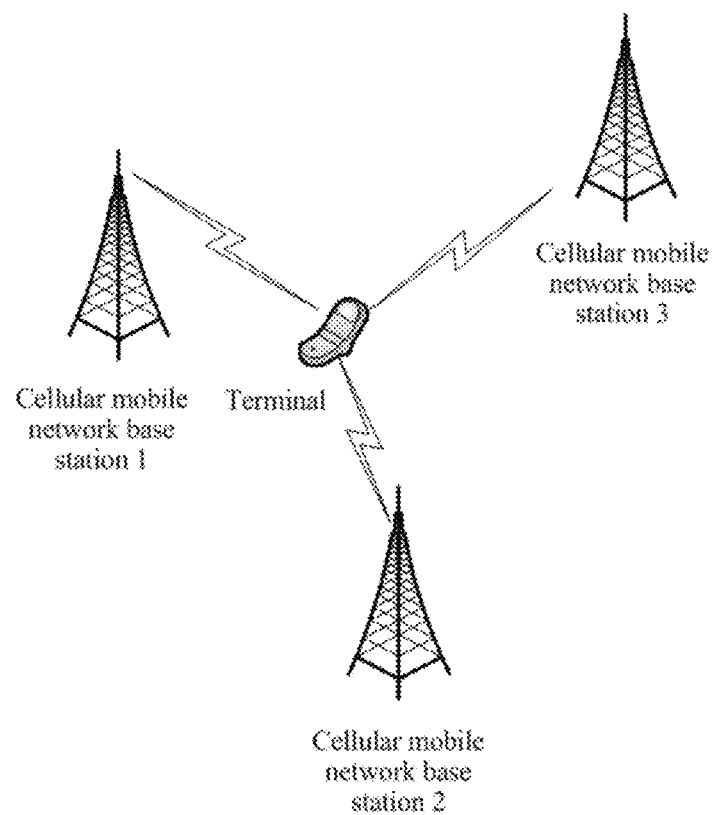
FIG. 7 is an application scenario diagram of a data transmission method according to an embodiment of the present invention.

It should be noted that the embodiment shown in FIG. 3 is described by using an example in which a terminal exchanges data of an application with a server by using a same physical network interface card. The terminal interacts with the server by using a wireless Wi-Fi network (as shown in FIG. 6, FIG. 6 shows that the terminal interacts with the server by using an access point 1 and an access point 2) or a wireless cellular network (as shown in FIG. 7, FIG. 7 shows that the terminal communicates with a base station 1, a base station 2, and a base station 3 that are near the terminal), because the terminal generally uses different physical network interface cards to access the wireless Wi-Fi network and the wireless cellular mobile network. In another situation, a terminal device includes two pieces of radio hardware, which may be used to access a wireless Wi-Fi network and a wireless cellular mobile network, respectively. Considering that the wireless cellular network usually charges based on traffic, when the terminal is located within a service coverage area of an access node that is of a wireless Wi-Fi network and can be used for data transmission, the wireless Wi-Fi network may be preferably selected for data transmission, including aggregation, switching, and the like based on signal information of a candidate access point of the wireless Wi-Fi network, and a wireless network interface card used to access the wireless cellular network is used as a backup. In a Linux system, a command "ip link set dev eth1 multipath backup" may be used to set the wireless cellular network as a backup. When a network environment changes, and a wireless Wi-Fi network cannot cover the terminal or does not have a strong signal strength, a virtual network interface card and a port that are corresponding to a physical network interface card that accesses the wireless Wi-Fi network are disabled, and a port corresponding to a physical network interface card that accesses the backup wireless cellular network is enabled. Because the Multipath TCP is used, a TCP connection is not disconnected in a data transmission link switching process, network resources are fully utilized, and data transmission efficiency is improved. Certainly, if charging of the wireless cellular network is not considered, a virtual network interface card and a port that are corresponding to a physical network interface card of the wireless Wi-Fi network and a port corresponding to a physical network interface card of the wireless cellular network may be enabled by means of program setting, so that a data stream is transmitted on a link of the wireless Wi-Fi network and a link of the wireless cellular network if the network environment permits. This is not limited in this embodiment of the present invention, and a quantity of links of the wireless Wi-Fi network or a quantity of links of the wireless cellular network is not limited, either. For example, in some scenarios, there may be aggregation of multiple links of the wireless Wi-Fi network and links of the wireless cellular mobile network.

In conclusion, the embodiment corresponding to FIG. 3 provides a data transmission method. Multiple access nodes are accessed one-to-one through multiple ports corresponding to a same physical network interface card, so that an application on the terminal exchanges data with a network-side server by using a transmission link corresponding to an access node accessed by the terminal. The Multipath TCP is executed during data exchange, so that multiple transmission links can be multiplexed under a same TCP connection of the application for simultaneous data transmission, and the TCP connection of the application does not need to be re-established in a process of adding or changing a transmission link. Therefore, data transmission efficiency is improved, a terminal device can fully utilize network resources, user waiting time is shortened, and data transmission between application software on the terminal and a network-side server during switching of a transport network is more fluent.

Figure 8:
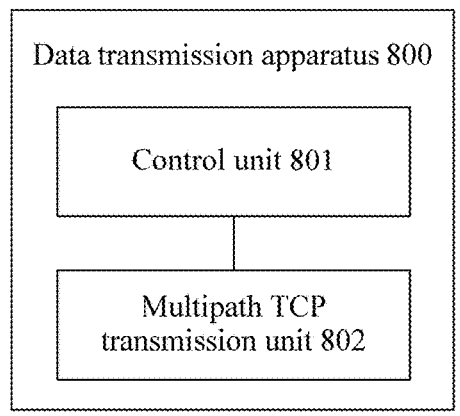
FIG. 8 is a structural diagram of a data transmission apparatus according to an embodiment of the present invention.

FIG. 8 shows a schematic diagram of a data transmission apparatus 800. The data transmission apparatus 800 is located in a terminal. The terminal includes one or more physical network interface cards, one physical network interface card is corresponding to multiple virtual network interface cards, the multiple virtual network interface cards are in a one-to-one correspondence with multiple ports, the multiple ports include a first port and a second port set, the second port set includes one or more ports, the terminal is located within a service coverage area of a first access node and that of an access node in a candidate access node set, the first access node and the access node in the candidate access node set belong to a same type of wireless network, and the candidate access node set includes at least one access node. The data transmission apparatus 800 includes:

a control unit 801, configured to control the terminal to exchange data of an application with a server through the first port by using the first access node; access one access node in the candidate access node set through an enabled port in the second port set when one port in the second port set is in an enabled state, or access at least one access node in the candidate access node set one-to-one through at least one port of multiple enabled ports in the second port set when multiple ports in the second port set are in an enabled state; and a Multipath TCP transmission unit 802, configured to exchange, based on the Multipath TCP, the data of a application with a server through an enabled port by using an access node corresponding to the enabled port, where the Multipath TCP is used for distributing the data to a data link corresponding to the access node.

Referring to an architectural diagram of the terminal related to the present invention and shown in FIG. 1, the data transmission apparatus described in the embodiment corresponding to FIG. 8 is corresponding to an application layer and a transport layer of the terminal shown in FIG. 1.

Specifically, the control unit 801 at the application layer and the Multipath TCP transmission unit 802 at the transport layer are used to drive and invoke a physical network interface card at a hardware layer of the terminal and a virtual network interface card and a port that are at the driver layer, thereby completing data transmission. In addition, it should be noted that access nodes that belong to a same type of wireless network, such as access nodes that all belong to a wireless Wi-Fi network, or access nodes that all belong to a wireless cellular network.

Specifically, in an implementation manner, before accessing one access node in the candidate access node set through an enabled port in the second port set, the control unit 801 is further configured to obtain a signal strength of the access node in the candidate access node set.

Correspondingly, the control unit 801 is specifically configured to obtain a first subset of the candidate access node set, where a signal strength corresponding to an access node in the first subset is greater than a signal strength threshold; and when the first subset includes at least one access node, access one access node in the first subset through only one enabled port in the second port set, or access the at least one access node in the first subset one-to-one through at least one port of multiple enabled ports in the second port set.

Specifically, in another implementation manner, before accessing one access node in the candidate access node set through an enabled port in the second port set, the control unit 801 is further configured to obtain a signal frequency of the access node in the candidate access node set.

Correspondingly, the control unit 801 is specifically configured to obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; and when the second subset includes at least one access node, access one access node in the second subset through only one enabled port in the second port set, or access the at least one access node in the second subset one-to-one through at least one port of multiple enabled ports in the second port set.

Specifically, in still another implementation manner, before accessing one access node in the candidate access node set through an enabled port in the second port set, the control unit 801 is further configured to obtain a signal strength and a signal frequency of the access node in the candidate access node set.

Correspondingly, the control unit 801 is specifically configured to obtain a first subset of the candidate access node set, where a signal strength corresponding to an access node in the first subset is greater than a signal strength threshold; obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; obtain an intersection set of the first subset and the second subset according to the first subset and the second subset; and when the intersection set includes at least one access node, access one access node in the intersection set through only one enabled port in the second port set, or access the at least one access node in the intersection set one-to-one through at least one port of multiple enabled ports in the second port set.

Optionally, the control unit 801 is further configured to adjust the first port to a disabled state.

Optionally, the control unit 801 is further configured to disable the first port when a signal strength of the first access node corresponding to the first port is less than the signal strength threshold.

Specifically, with respect to the accessing one access node in the candidate access node set through an enabled port in the second port set when one port in the second port set is in an enabled state, the control unit 801 is specifically configured to enable one port in the second port set; and access one access node in the candidate access node set through the enabled port in the second port set.

Alternatively, with respect to the accessing at least one access node in the candidate access node set one-to-one through at least one port of multiple enabled ports in the second port set when multiple ports in the second port set are in an enabled state, the control unit 801 is specifically configured to enable multiple ports in the second port set; and access at least one access node in the candidate access node set one-to-one through at least one port of multiple enabled ports in the second port set.

Specifically, in an implementation manner, the Multipath TCP transmission unit 802 is configured to segment the data according to the Multipath TCP, and establish, between the terminal and the server, one TCP connection that includes multiple substreams, where each substream is in a one-to-one correspondence with an access node corresponding to the enabled port; and exchange, by using the multiple substreams, the segmented data with the server through the enabled port and the access node corresponding to the enabled port, where each segment of the segmented data is corresponding to one of the substreams.

The data transmission apparatus 800 shown in FIG. 8 may be implemented in another manner. The data transmission apparatus 800 is still located in a terminal. The terminal includes one or more physical network interface cards, one physical network interface card is corresponding to multiple virtual network interface cards, the multiple virtual network interface cards are in a one-to-one correspondence with multiple ports, the terminal is located within a service coverage area of an access node in a candidate access node set, the candidate access node set includes two or more access nodes, and the access nodes in the candidate access node set belong to a same type of wireless network. The data transmission apparatus 800 includes:

a control unit 801, configured to access the at least two access nodes through at least two enabled ports, where each port of the at least two ports is corresponding to one different access node; and a Multipath TCP transmission unit 802, configured to exchange, based on the Multipath TCP, data of a application with a server through the at least two ports by using the at least two access nodes, where the Multipath TCP is used for distributing the data to data links corresponding to the access nodes.

Likewise, referring to an architectural diagram of the terminal related to the present invention and shown in FIG. 1, the data transmission apparatus described in the another implementation manner of the embodiment corresponding to FIG. 8 is also corresponding to an application layer and a transport layer of the terminal shown in FIG. 1. Specifically, the control unit 801 at the application layer and the Multipath TCP transmission unit at the transport layer are used to drive and invoke a physical network interface card at a hardware layer of the terminal and a virtual network interface card and a port that are at the driver layer, thereby completing data transmission. In addition, it should be noted that access nodes that belong to a same type of wireless network, such as access nodes that all belong to a wireless Wi-Fi network, or access nodes that all belong to a wireless cellular network.

Specifically, in an implementation manner, before accessing the at least two access nodes through at least two enabled ports, the control unit 801 is further configured to obtain a signal strength of the access node in the candidate access node set; and correspondingly, with respect to the accessing the at least two access nodes through at least two enabled ports, the control unit 801 is specifically configured to obtain a first subset of the candidate access node set, where a signal strength corresponding to an access node in the first subset is greater than a signal strength threshold; and when the first subset includes at least two access nodes, access the at least two access nodes in the first subset one-to-one through the at least two enabled ports.

Specifically, in another implementation manner, before accessing the at least two access nodes through at least two enabled ports, the control unit 801 is further configured to obtain a signal frequency of an access node in the candidate access node set; and correspondingly, with respect to the accessing the at least two access nodes through at least two enabled ports, the control unit 801 is specifically configured to obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; and when the second subset includes at least two access nodes, access the at least two access nodes in the second subset one-to-one through the at least two enabled ports.

Specifically, in still another implementation manner, before accessing the at least two access nodes through at least two enabled ports, the control unit 801 is further configured to obtain a signal strength and a signal frequency of the access node in the candidate access node set; and correspondingly, with respect to the accessing the at least two access nodes through at least two enabled ports, the control unit 801 is further configured to:

obtain a first subset of the candidate access node set, where a signal strength corresponding to an access node in the first subset is greater than a signal strength threshold; obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; obtain an intersection set of the first subset and the second subset according to the first subset and the second subset; and when the intersection set includes at least two access nodes, access at least two access nodes in the second subset one-to-one through the at least two enabled ports.

Optionally, with respect to the accessing the at least two access nodes through at least two enabled ports, where each port of the at least two ports is corresponding to one different access node, the control unit 801 is specifically configured to enable at least two ports; and access the at least two access nodes through at least two enabled ports, where each port of the at least two ports is corresponding to one different access node.

Specifically, in an implementation manner, the Multipath TCP transmission unit 802 is configured to segment the data according to the Multipath TCP, and establish, between the terminal and the server, one TCP connection that includes multiple substreams, where each substream is in a one-to-one correspondence with an access node corresponding to the enabled port; and exchange, by using the multiple substreams, the segmented data with the server through the enabled port and the access node corresponding to the enabled port, where each segment of the segmented data is corresponding to one of the substreams.

In conclusion, the embodiment shown in FIG. 8 describes a data transmission apparatus. The apparatus is located in a terminal. Multiple access nodes are accessed one-to-one through multiple ports corresponding to a same physical network interface card, so that an application on the terminal exchanges data with a network-side server by using a transmission link corresponding to an access node accessed by the terminal. The Multipath TCP is executed during data exchange, so that multiple transmission links can be multiplexed under a same TCP connection of the application for simultaneous data transmission, and the TCP connection of the application does not need to be re-established in a process of adding or changing a transmission link. Therefore, data transmission efficiency is improved, a terminal device can fully utilize network resources, user waiting time is shortened, and data transmission between application software on the terminal and a network-side server during switching of a transport network is more fluent.

Figure 9:
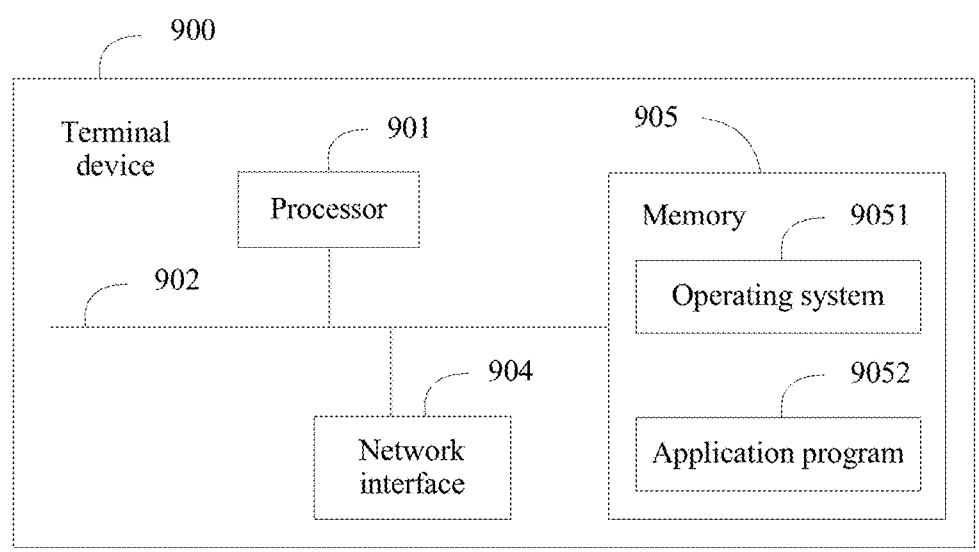
FIG. 9 is a structural diagram of another data transmission apparatus according to an embodiment of the present invention.

FIG. 9 describes a structure of a terminal device 900 provided in an embodiment of the present invention. The data transmission methods in the embodiments of the present invention are applicable to the terminal device 900. The terminal device 900 includes: at least one processor 901, a network interface 904, a memory 905, and at least one communications bus 902. The network interface 904 includes at least one physical network interface card, the physical network interface card is corresponding to multiple virtual network interface cards, and the multiple virtual network interface cards are in a one-to-one correspondence with multiple ports, which is not marked in the figure. The communication bus 902 is configured to implement connection and communication between the components. Optionally, the terminal device 900 includes a user interface 903, including a display (for example, a touchscreen, an LCD, a CRT, a holographic imaging device (Holographic), a projector (Projector), or the like), a keyboard or a pointer device (for example, a mouse, a trackball (trackball), a touch panel or a touchscreen).

The memory 905 may include a read-only memory and a random access memory, and provides an instruction and data for the processor 901. A part of the memory 905 may further include a non-volatile random access memory (NVRAM).

In some implementation manners, the memory 905 stores the following elements, executable modules or data structures, or a subset of them, or an extension set of them: an operating system 9051, including various system programs, such as a framework layer, a core base layer, or a driver layer, and used to implement various basic services and process a hardware-based task; and an application program module 9052, including various application programs, such as a desktop, a media player, or a browser, and used to implement various application services.

In this embodiment of the present invention, by invoking a program or an instruction that is stored in the memory 905, the processor 901 is configured to: exchange data of an application with a server through the first port by using the first access node; access one access node in the candidate access node set through an enabled port in the second port set when one port in the second port set is in an enabled state, or access at least one access node in the candidate access node set one-to-one through at least one port of multiple enabled ports in the second port set when multiple ports in the second port set are in an enabled state; and exchange, based on the Multipath TCP, the data of a application with a server through an enabled port by using an access node corresponding to the enabled port, where the Multipath TCP is used for distributing the data to a data link corresponding to the access node.

Optionally, as an embodiment, the processor 901 is further configured to obtain a signal strength of the access node in the candidate access node set.

Correspondingly, the processor 901 is specifically configured to:

obtain a first subset of the candidate access node set, where a signal strength corresponding to an access node in the first subset is greater than a signal strength threshold; and when the first subset includes at least one access node, access one access node in the first subset through only one enabled port in the second port set, or access the at least one access node in the first subset one-to-one through at least one port of multiple enabled ports in the second port set.

Optionally, as an embodiment, the processor 901 is further configured to obtain a signal frequency of the access node in the candidate access node set.

Correspondingly, the processor 901 is specifically configured to obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; and when the second subset includes at least one access node, access one access node in the second subset through only one enabled port in the second port set, or access the at least one access node in the second subset one-to-one through at least one port of multiple enabled ports in the second port set.

Optionally, as an embodiment, the processor 901 is further configured to obtain a signal strength and a signal frequency of the access node in the candidate access node set.

Correspondingly, the processor 901 is specifically configured to obtain a first subset of the candidate access node set, where a signal strength corresponding to an access node in the first subset is greater than a signal strength threshold; obtain a grouping result of the signal frequency according to a channel frequency range of a wireless network, where each group is corresponding to one different channel in the grouping result; obtain a second subset of the candidate access node set according to the grouping result, where a signal frequency of a access node in the second subset belongs to a different group; obtain an intersection set of the first subset and the second subset according to the first subset and the second subset; and when the intersection set includes at least one access node, access one access node in the intersection set through only one enabled port in the second port set, or access the at least one access node in the intersection set one-to-one through at least one port of multiple enabled ports in the second port set.

Optionally, as an embodiment, the processor 901 is further configured to adjust the first port to a disabled state.

Optionally, as an embodiment, the processor 901 is further configured to disable the first port when a signal strength of the first access node corresponding to the first port is less than the signal strength threshold.

Specifically, with respect to the accessing one access node in the candidate access node set through an enabled port in the second port set when one port in the second port set is in an enabled state, the processor 901 is specifically configured to enable one port in the second port set; and access one access node in the candidate access node set through the enabled port in the second port set; or with respect to the accessing at least one access node in the candidate access node set one-to-one through at least one port of multiple enabled ports in the second port set when multiple ports in the second port set are in an enabled state, the processor 901 is specifically configured to enable multiple ports in the second port set; and access at least one access node in the candidate access node set one-to-one through at least one port of multiple enabled ports in the second port set.

Similarly, the terminal device 900 may further execute the methods and the embodiments in FIG. 2b and FIG. 3. Details are not described herein in this embodiment of the present invention.

It can be learned that, by using the foregoing solutions, a terminal may access multiple access nodes one-to-one through multiple ports of a same physical network interface card, so that an application on the terminal exchanges data with a network-side server by using a transmission link corresponding to an access node accessed by the terminal. The Multipath TCP is executed during data exchange, so that multiple transmission links can be multiplexed under a same TCP connection of the application for simultaneous data transmission, and the TCP connection of the application does not need to be re-established in a process of adding or changing a transmission link. Therefore, data transmission efficiency is improved, a terminal device can fully utilize network resources, user waiting time is shortened, and data transmission between application software on the terminal and a network-side server during switching of a transport network is more fluent.

A person of ordinary skill in the art may understand that all or some of the processes of the methods in the embodiments may be implemented by a computer program instructing relevant hardware (such as a processor). The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The above is a data transmission method and apparatus for a terminal provided in the embodiments of the present invention. The description of the embodiments is merely intended to help understand the method and core idea of the present invention. In addition, a person of ordinary skill in the art may make modifications to the specific implementation manners and the application scope according to the idea of the present invention. Therefore, the content of the specification shall not be construed as a limitation on the present invention.

What is claimed is:

1. A data transmission method for a terminal, wherein the terminal comprises one or more physical network interface cards, one physical network interface card corresponds to multiple virtual network interface cards, the multiple virtual network interface cards are in a one-to-one correspondence with multiple ports, the multiple ports comprise a first port and a second port set, the second port set comprises one or more ports, the terminal is located within a service coverage area of a first access node and that of an access node in a candidate access node set, the first access node and the access node in the candidate access node set belong to a same type of wireless network, and the candidate access node set comprises at least one access node, the method comprising:
  exchanging, by the terminal, data of an application with a server through the first port by using the first access node;
  accessing one access node in the candidate access node set through an enabled port in the second port set when one port in the second port set is in an enabled state, or accessing at least one access node in the candidate access node set one-to-one through at least one port of multiple enabled ports in the second port set when multiple ports in the second port set are in an enabled state; and
  exchanging, based on a Multipath Transmission Control Protocol (TCP), the data of the application with the server through an enabled port by using an access node corresponding to the enabled port, wherein the Multipath TCP is used for distributing the data to a data link corresponding to the access node.

2. The method according to claim 1, wherein before accessing the one access node in the candidate access node set through the enabled port in the second port set, the method further comprises:
  obtaining a signal strength of the access node in the candidate access node set; and
  correspondingly, accessing the one access node in the candidate access node set through the enabled port in the second port set, or accessing at least one access node in the candidate access node set one-to-one through at least one port of multiple enabled ports in the second port set comprises:
    obtaining a first subset of the candidate access node set, wherein a signal strength corresponding to an access node in the first subset is greater than a signal strength threshold, and
    when the first subset comprises at least one access node, accessing one access node in the first subset through only one enabled port in the second port set, or accessing the at least one access node in the first subset one-to-one through at least one port of multiple enabled ports in the second port set.

3. The method according to claim 1, wherein before accessing the one access node in the candidate access node set through an enabled port in the second port set, the method further comprises:
  obtaining a signal frequency of the access node in the candidate access node set; and
  correspondingly, accessing the one access node in the candidate access node set through the enabled port in the second port set, or accessing at least one access node in the candidate access node set one-to-one through at least one port of multiple enabled ports in the second port set comprises:
    obtaining a grouping result of the signal frequency according to a channel frequency range of a wireless network, wherein each group corresponds to a different channel in the grouping result,
    obtaining a second subset of the candidate access node set according to the grouping result, wherein a signal frequency of an access node in the second subset belongs to a different group, and
    when the second subset comprises at least one access node, accessing the at least one access node in the second subset through only one enabled port in the second port set, or accessing the at least one access node in the second subset one-to-one through at least one port of multiple enabled ports in the second port set.

4. The method according to claim 1, wherein before accessing the one access node in the candidate access node set through an enabled port in the second port set, the method further comprises:
  obtaining a signal strength and a signal frequency of the access node in the candidate access node set; and
  correspondingly, accessing the one access node in the candidate access node set through an enabled port in the second port set, or accessing at least one access node in the candidate access node set one-to-one through at least one port of multiple enabled ports in the second port set comprises:
    obtaining a first subset of the candidate access node set, wherein a signal strength corresponding to an access node in the first subset is greater than a signal strength threshold,
    obtaining a grouping result of the signal frequency according to a channel frequency range of a wireless network, wherein each group corresponds to a different channel in the grouping result,
    obtaining a second subset of the candidate access node set according to the grouping result, wherein a signal frequency of an access node in the second subset belongs to a different group,
    obtaining an intersection set of the first subset and the second subset according to the first subset and the second subset, and
    when the intersection set comprises at least one access node, accessing one access node in the intersection set through only one enabled port in the second port set, or accessing the at least one access node in the intersection set one-to-one through at least one port of multiple enabled ports in the second port set.

5. The method according to claim 1, wherein before accessing the one access node in the candidate access node set through the enabled port in the second port set when one port in the second port set is in an enabled state, or accessing at least one access node in the candidate access node set one-to-one through at least one enabled port in the second port set when multiple ports in the second port set are in an enabled state, the method further comprises:
  adjusting a state of the first port to a disabled state.

6. The method according to claim 5, wherein adjusting the state of the first port to the disabled state comprises:
  disabling the first port when a signal strength of the first access node corresponding to the first port is less than the signal strength threshold.

7. The method according to claim 1, wherein accessing the one access node in the candidate access node set through the enabled port in the second port set when one port in the second port set is in an enabled state comprises:
  enabling one port in the second port set; and
  accessing one access node in the candidate access node set through the enabled port in the second port set; or
  accessing the at least one access node in the candidate access node set one-to-one through at least one enabled port in the second port set when multiple ports in the second port set are in an enabled state comprises:
  enabling multiple ports in the second port set, and
  accessing at least one access node in the candidate access node set one-to-one through at least one enabled port in the second port set.

8. A data transmission method for a terminal, wherein the terminal comprises one or more physical network interface cards, one physical network interface card corresponds to multiple virtual network interface cards, the multiple virtual network interface cards are in a one-to-one correspondence with multiple ports, the terminal is located within a service coverage area of an access node in a candidate access node set, the candidate access node set comprises two or more access nodes, and the access nodes in the candidate access node set belong to a same type of wireless network; and the method comprises:

accessing the at least two access nodes through at least two enabled ports, wherein each port of the at least two enabled ports corresponds to a different access node; and exchanging, based on a Multipath Transmission Control Protocol (TCP), data of an application with a server through the at least two enabled ports by using the at least two access nodes, wherein the Multipath TCP is used for distributing the data to data links corresponding to the access nodes.

9. The method according to claim 8, wherein before accessing the at least two access nodes through the at least two enabled ports, the method further comprises:

obtaining a signal strength of the access node in the candidate access node set; and correspondingly, accessing the at least two access nodes through the at least two enabled ports comprises:

obtaining a first subset of the candidate access node set, wherein a signal strength corresponding to an access node in the first subset is greater than a signal strength threshold, and when the first subset comprises at least two access nodes, accessing the at least two access nodes in the first subset one-to-one through the at least two enabled ports.

10. The method according to claim 8, wherein before accessing the at least two access nodes through the at least two enabled ports, the method further comprises:

obtaining a signal frequency of the access node in the candidate access node set; and correspondingly, the accessing the at least two access nodes through at least two enabled ports comprises:

obtaining a grouping result of the signal frequency according to a channel frequency range of a wireless network, wherein each group corresponds to a different channel in the grouping result, obtaining a second subset of the candidate access node set according to the grouping result, wherein a signal frequency of a access node in the second subset belongs to a different group, and when the second subset comprises at least two access nodes, accessing the at least two access nodes in the second subset one-to-one through the at least two enabled ports.

11. The method according to claim 8, wherein before accessing the at least two access nodes through the at least two enabled ports, the method further comprises:

obtaining a signal strength and a signal frequency of the access node in the candidate access node set; and correspondingly, accessing the at least two access nodes through the at least two enabled ports comprises:

obtaining a first subset of the candidate access node set, wherein a signal strength corresponding to an access node in the first subset is greater than a signal strength threshold, obtaining a grouping result of the signal frequency according to a channel frequency range of a wireless network, wherein each group corresponds to a different channel in the grouping result, obtaining a second subset of the candidate access node set according to the grouping result, wherein a signal frequency of an access node in the second subset belongs to a different group, obtaining an intersection set of the first subset and the second subset according to the first subset and the second subset, and when the intersection set comprises at least two access nodes, accessing at least two access nodes in the second subset one-to-one through the at least two enabled ports.

12. The method according to claim 8, wherein accessing the at least two access nodes through the at least two enabled ports, wherein each port of the at least two enabled ports corresponds to a different access node comprises:

enabling at least two ports; and accessing the at least two access nodes through the at least two enabled ports, wherein each port of the at least two enabled ports corresponds to a different access node.

13. A data transmission apparatus, wherein the apparatus is located in a terminal, the terminal comprises one or more physical network interface cards, one physical network interface card corresponds to multiple virtual network interface cards, the multiple virtual network interface cards are in a one-to-one correspondence with multiple ports, the multiple ports comprise a first port and a second port set, the second port set comprises one or more ports, the terminal is located within a service coverage area of a first access node and that of an access node in a candidate access node set, the first access node and the access node in the candidate access node set belong to a same type of wireless network, and the candidate access node set comprises at least one access node, the apparatus comprising:

a processor; and a memory, the memory comprising instructions that, when executed by the processor, cause the apparatus to:

exchange data of an application with a server through the first port by using the first access node, access one access node in the candidate access node set through an enabled port in the second port set when one port in the second port set is in an enabled state, or access at least one access node in the candidate access node set one-to-one through at least one port of multiple enabled ports in the second port set when multiple ports in the second port set are in an enabled state, and exchange, based on a Multipath Transmission Control Protocol (TCP), the data of the application with the server through an enabled port by using an access node corresponding to the enabled port, wherein the Multipath TCP is used for distributing the data to a data link corresponding to the access node.

14. The apparatus according to claim 13, wherein the memory further comprises instructions that, when executed by the processor, cause the apparatus to:

before accessing one access node in the candidate access node set through an enabled port in the second port set, obtain a signal strength of the access node in the candidate access node set;

correspondingly, obtain a first subset of the candidate access node set, wherein a signal strength corresponding to an access node in the first subset is greater than a signal strength threshold; and when the first subset comprises at least one access node, access one access node in the first subset through only one enabled port in the second port set, or access the at least one access node in the first subset one-to-one through at least one port of multiple enabled ports in the second port set.

15. The apparatus according to claim 13, wherein the memory further comprises instructions that, when executed by the processor, cause the apparatus to:
before accessing one access node in the candidate access node set through an enabled port in the second port set, obtain a signal frequency of the access node in the candidate access node set; and
correspondingly, obtain a grouping result of the signal frequency according to a channel frequency range of a wireless network, wherein each group corresponds to one different channel in the grouping result;
obtain a second subset of the candidate access node set according to the grouping result, wherein a signal frequency of an access node in the second subset belongs to a different group; and
when the second subset comprises at least one access node, access one access node in the second subset through only one enabled port in the second port set, or access the at least one access node in the second subset one-to-one through at least one port of multiple enabled ports in the second port set.

16. The apparatus according to claim 13, wherein the memory further comprises instructions that, when executed by the processor, cause the apparatus to:
before accessing one access node in the candidate access node set through an enabled port in the second port set, obtain a signal strength and a signal frequency of the access node in the candidate access node set;
correspondingly, obtain a first subset of the candidate access node set, wherein a signal strength corresponding to an access node in the first subset is greater than a signal strength threshold;
obtain a grouping result of the signal frequency according to a channel frequency range of a wireless network, wherein each group corresponds to one different channel in the grouping result; obtain a second subset of the candidate access node set according to the grouping result, wherein a signal frequency of a access node in the second subset belongs to a different group;
obtain an intersection set of the first subset and the second subset according to the first subset and the second subset; and
when the intersection set comprises at least one access node, access one access node in the intersection set through only one enabled port in the second port set, or access the at least one access node in the intersection set one-to-one through at least one port of multiple enabled ports in the second port set.

17. The apparatus according to claim 13, wherein the memory further comprises instructions that, when executed by the processor, cause the apparatus to:
adjust a state of the first port to a disabled state.

18. The apparatus according to claim 13, wherein the memory further comprises instructions that, when executed by the processor, cause the apparatus to:
disable the first port when a signal strength of the first access node corresponding to the first port is less than the signal strength threshold.

19. The apparatus according to claim 13, wherein the memory further comprises instructions that, when executed by the processor, cause the apparatus to:
with respect to accessing the one access node in the candidate access node set through an enabled port in the second port set when one port in the second port set is in an enabled state:
enable one port in the second port set, and
access one access node in the candidate access node set through the enabled port in the second port set; or
with respect to accessing the at least one access node in the candidate access node set one-to-one through at least one enabled port in the second port set when multiple ports in the second port set are in an enabled state:
enable multiple ports in the second port set, and
access at least one access node in the candidate access node set one-to-one through at least one enabled port in the second port set.

20. A data transmission apparatus, wherein the apparatus is located in a terminal, the terminal comprises one or more physical network interface cards, one physical network interface card corresponds to multiple virtual network interface cards, the multiple virtual network interface cards are in a one-to-one correspondence with multiple ports, the terminal is located within a service coverage area of an access node in a candidate access node set, the candidate access node set comprises two or more access nodes, and the access nodes in the candidate access node set belong to a same type of wireless network, the apparatus comprising:
a processor; and
a memory, the memory comprising instructions that, when executed by the processor, cause the apparatus to:
access the at least two access nodes through at least two enabled ports, wherein each port of the at least two enabled ports corresponds to a different access node; and
exchange, based on a Multipath Transmission Control Protocol (TCP), data of an application with a server through the at least two enabled ports by using the at least two access nodes, wherein the Multipath TCP is used for distributing the data to data links corresponding to the access nodes.

21. The apparatus according to claim 20, wherein the memory further comprises instructions that, when executed by the processor, cause the apparatus to:
obtain a signal strength of the access node in the candidate access node set; and
correspondingly, with respect to accessing the at least two access nodes through the at least two enabled ports:
obtain a first subset of the candidate access node set, wherein a signal strength corresponding to an access node in the first subset is greater than a signal strength threshold, and
when the first subset comprises at least two access nodes, access the at least two access nodes in the first subset one-to-one through the at least two enabled ports.

22. The apparatus according to claim 20, wherein the memory further comprises instructions that, when executed by the processor, cause the apparatus to:
obtain a signal frequency of the access node in the candidate access node set; and
correspondingly, with respect to accessing the at least two access nodes through the at least two enabled ports:
obtain a grouping result of the signal frequency according to a channel frequency range of a wireless network, wherein each group corresponds to one different channel in the grouping result, obtain a second subset of the candidate access node set according to the grouping result, wherein a signal frequency of a access node in the second subset belongs to a different group, and when the second subset comprises at least two access nodes, access the at least two access nodes in the second subset one-to-one through the at least two enabled ports.

23. The apparatus according to claim 20, wherein the memory further comprises instructions that, when executed by the processor, cause the apparatus to:

obtain a signal strength and a signal frequency of the access node in the candidate access node set; and correspondingly, with respect to accessing the at least two access nodes through the at least two enabled ports:

obtain a first subset of the candidate access node set, wherein the signal strength corresponding to an access node in the first subset is greater than a signal strength threshold, obtain a grouping result of the signal frequency according to a channel frequency range of a wireless network, wherein each group corresponds to one different channel in the grouping result, obtain a second subset of the candidate access node set according to the grouping result, wherein a signal frequency of the access node in the second subset belongs to a different group, obtain an intersection set of the first subset and the second subset according to the first subset and the second subset, and when the intersection set comprises at least two access nodes, access at least two access nodes in the second subset through at least two ports of the enabled ports.

24. A computer-readable non-transitory storage medium comprising instructions that, when executed by a computer, cause the computer to carry out the steps of the method of claim 1.

25. A computer-readable non-transitory storage medium comprising instructions that, when executed by a computer, cause the computer to carry out the steps of the method of claim 8.

* * * * *